United States Patent
Mercado Alvarado

(10) Patent No.: US 12,233,388 B2
(45) Date of Patent: Feb. 25, 2025

(54) LIQUID POLYMER OR CHEMICAL ACTIVATION SYSTEM USING A SUBMERSIBLE ACTUATOR

(71) Applicant: Adalberto Mercado Alvarado, Bayamon, PR (US)

(72) Inventor: Adalberto Mercado Alvarado, Bayamon, PR (US)

( * ) Notice: Subject to any disclaimer, the term of this patent is extended or adjusted under 35 U.S.C. 154(b) by 1040 days.

(21) Appl. No.: 17/164,367

(22) Filed: Feb. 1, 2021

(65) Prior Publication Data

US 2021/0154887 A1 May 27, 2021

Related U.S. Application Data

(63) Continuation-in-part of application No. 16/906,882, filed on Jun. 19, 2020, now Pat. No. 11,766,644, which is a continuation-in-part of application No. 15/787,758, filed on Oct. 19, 2017, now Pat. No. 10,766,011.

(51) Int. Cl.
*B01F 27/91* (2022.01)
*F04C 2/107* (2006.01)

(52) U.S. Cl.
CPC ............ *B01F 27/91* (2022.01); *F04C 2/1073* (2013.01)

(58) Field of Classification Search
CPC ................ B01F 27/91; B01F 35/71731; B01F 35/32045; B01F 35/3204; B01F 35/71775; B01F 23/53; B01F 27/25
See application file for complete search history.

(56) References Cited

U.S. PATENT DOCUMENTS

| | | | | | |
|---|---|---|---|---|---|
| 4,242,199 | A | * | 12/1980 | Kelley | B01F 23/454 |
| | | | | | 210/197 |
| 4,512,936 | A | * | 4/1985 | Oshima | B01F 27/25 |
| | | | | | 210/219 |
| 5,043,104 | A | * | 8/1991 | Stirling | B01F 25/31242 |
| | | | | | 210/219 |

(Continued)

FOREIGN PATENT DOCUMENTS

| | | | | |
|---|---|---|---|---|
| GB | 2095570 A | * | 10/1982 | ............... B01F 5/10 |
| JP | H07114947 B2 | * | 12/1995 | ............... B01F 3/04 |
| WO | WO-8702907 A1 | * | 5/1987 | ............. B01D 21/24 |

*Primary Examiner* — Marc C Howell

(74) *Attorney, Agent, or Firm* — Eugenio J. Torres-Oyola; Victor M. Rodriguez-Reyes; Rafael Rodriguez-Muriel

(57) ABSTRACT

A liquid polymer or chemical activation system, having a chamber; a top cover plate, a middle cover plate and a bottom cover plate; wherein such configuration creates a hollow space inside the chamber that is flanked by the top cover plate and the bottom cover plate; a hybrid pump blending reactor having a progressive cavity pump and one or more inlets for receiving first and second substances; an upper multistage mixing cup configured to receive the first and second substances from the hybrid pump blending reactor; at least one high shear mixer for mixing the first and second substances; at least one submersible actuator for actuating the high shear mixer; an intermediate blending section for receiving the mix of first and second substances from the upper multistage mixing cup; a lower multistage aging cup for further mixing of the first and second substances; and at least one outlet on the bottom cover plate for releasing the mix of first and second substances.

19 Claims, 30 Drawing Sheets

(56) References Cited

U.S. PATENT DOCUMENTS

| | | | | |
|---|---|---|---|---|
| 5,192,047 | A * | 3/1993 | Lisi | B01F 27/25 248/176.1 |
| 5,213,718 | A * | 5/1993 | Burgess | B01F 23/233 261/93 |
| 5,996,977 | A * | 12/1999 | Burgess | B01F 27/25 261/93 |
| 6,736,377 | B1 * | 5/2004 | Chien | B01F 27/25 261/93 |
| 2006/0180948 | A1 * | 8/2006 | Howk | B01F 27/91 261/91 |
| 2008/0159061 | A1 * | 7/2008 | Han | B01F 25/64 366/102 |
| 2010/0207285 | A1 * | 8/2010 | Tanaka | B01F 27/25 261/84 |
| 2019/0118148 | A1 * | 4/2019 | Mercado Alvarado | B01F 27/25 |

\* cited by examiner

LIQUID POLYMER OR CHEMICAL ACTIVATION SYSTEM USING A SUBMERSIBLE ACTUATOR

CROSS-REFERENCE TO RELATED APPLICATION

This application is a continuation-in-part of, and claims the benefit of priority to, U.S. patent application Ser. No. 16/906,882, filed on Jun. 16, 2020, entitled "Liquid Polymer or Chemical Activation System Using a Submersible Actuator" and incorporated by reference in its entirety herein, which in turn is a continuation-in-part of U.S. patent application Ser. No. 15/787,758, filed on Oct. 19, 2017, entitled "Liquid Polymer Activation System Using a Submersible Actuator" the contents of which are hereby incorporated by reference.

STATEMENT REGARDING FEDERALLY SPONSORED RESEARCH AND DEVELOPMENT

N/A

BACKGROUND OF THE INVENTION

Field of the Invention

The present invention relates to a submersible mechanical blending mechanism, and more particularly relates to a structure built into a chamber including a polymer/chemical dilution and boosting system mechanically driven by a submersible motor.

Discussion of the Background

Generally, mechanical blending systems are used in the separation of liquids from solids (and vice versa) on water treatment plants, waste-water treatment plants, pharmaceutical plants, food and beverage plants, diary, distillery, power plants, industrial plants and mining processing facilities.

Further, standard mechanical and non-mechanical blending systems are used as ancillary equipment of liquid/solid separation technologies and play an essential role in sludge dewatering industries. In fact, the separation in sludge dewatering industries will not take place without a polymer blending system. For example, the polymer blending system are used with the following sludge dewatering equipment:
  Decanters
  High speed centrifuges
  Belt filter presses
  Gravity Belt thickeners
  Rotary Drum thickeners
  Plate presses
  Screw Presses
  Primary and secondary thickeners
  Market snapshot Standard mechanical and non-mechanical polymer blending systems use a single energy reaction chamber for dilution and activation of polymer. All of them depend on high inlet water pressure to get or maintain a constant blend if the inlet pressure is low; then the constant blend turns into variable blend. In variable blend systems the operator will follow two things that will increase consumption costs:
  Increase polymer dosing pump capacity.
  Decrease production to maintain process stability.

Standard mechanical polymer blending systems comprise an external motor, a water inlet, a polymer inlet, a mixing device, a mixing chamber reaction and a blend outlet. The minimum inlet pressure is 30-50 PSI wherein with a low water inlet pressure a poor blend is achieved.

The non-mechanical polymer blending systems comprises a water inlet, polymer inlet, mixing chamber reactor, static mixing device and blend outlet. The minimum inlet pressure is 60 PSI wherein with a low water inlet pressure a worst blend is achieved compared to the mechanical polymer blending system.

Therefore, there is a need for a mechanical blending system that provides a correct and constant blend if the inlet water feed pressure is under 35 PSI and 60 PSI for a non-mechanical blender.

SUMMARY OF THE INVENTION

In light of the above shortcomings of the structures available to provide a liquid polymer or chemical activation system, the present disclosure provides a mechanical blending system comprising a polymer dilution/activation technology with a submersible motor inside of a reaction chamber.

In particular, the present disclosure relates to a liquid polymer or chemical activation system, comprising: a chamber having a top chamber flange on a first distal end and a bottom chamber flange on a second distal end, wherein each distal end is opposite to each other; a top cover plate secured to the top chamber flange on the first distal end of the chamber via one or more bolts; a middle cover plate and a bottom cover plate secured to the bottom chamber flange on the second distal end of the chamber via one or more bolts, wherein the middle cover plate lies between the lower chamber flange and the bottom cover plate; wherein such configuration creates a hollow space inside the chamber that is flanked by the top cover plate and the bottom cover plate; a hybrid pump and blending reactor ("HP blending reactor") that comprises a first inlet for receiving at least a first substance, a second inlet for receiving at least a second substance, a progressive cavity pump, a progressive cavity pump supporting top ("PCP supporting top"), a progressive cavity pump supporting base ("PCP supporting base") and a connecting port; wherein the HP blending reactor is secured to the top cover plate; wherein the first inlet is secured to the PCP supporting top; wherein the second inlet is located on the connecting port; wherein the progressive cavity pump comprises a rotor and stator; wherein the progressive cavity pump is enclosed within a chamber in the PCP supporting top and PCP supporting base; wherein the rotor is configured to rotate and lead the first substance into the connecting port; wherein the connecting port is configured to receive the first substance from the progressive cavity pump and the second substance from the second inlet, thereby allowing the first and second substances to come into contact with each other; an upper multistage mixing cup configured to receive the first and second substances from the connecting port of the HP blending reactor; at least one high shear mixer for mixing the first and second substances; at least one submersible actuator for actuating the high shear mixer and rotor; wherein the high shear mixer is attached to a shaft extension which, in turn, has a first end that is coupled to the submersible actuator via a shaft coupling unit; wherein the rotor is attached to a second end of the shaft extension via a coupling pin; an intermediate blending section configured to receive the first and second substances from the upper multistage mixing cup; a cup base flange having a support platform for supporting one end of the upper multistage mixing cup; a lower multistage aging cup for further mixing of the first and second substances; wherein the upper multistage mixing cup comprises at least a first retention cup and a second retention cup, and wherein the second retention cup encircles the first retention cup; wherein the first and second substances are mixed by the high shear mixer in the first retention cup; wherein the second retention cup is configured to receive the first and second substances flowing from the first retention cup for further mixing; wherein the first and second substances are forwarded from the second retention cup into the intermediate blending section, where the first and second substances come into contact with the cup base flange; wherein the cup base flange is secured to the submersible actuator and comprises one or more holes configured to lead the first and second substances into the lower multistage aging cup; wherein a first end of the at least one submersible actuator is connected to the cup base flange and a second end of the submersible actuator is fixed to the middle cover plate, which serves a support base for the submersible actuator; wherein the lower multistage aging cup comprises a plurality of rings surrounding the submersible actuator, each ring having one or more holes configured to allow the first and second substances to flow into each subsequent ring until reaching the middle cover plate; and wherein the first and second substances are directed from the middle cover plate, via one or more holes on the middle cover plate, to the bottom cover plate which, in turn, has at least one outlet for releasing the mixed first and second substances.

To enable a better understanding of the objectives and features of the present invention, a brief description of the drawing below will be followed with a detailed description of the invention.

DETAILED DESCRIPTION OF THE INVENTION

The present disclosure discloses several exemplary embodiments of a liquid polymer or chemical activation system that uses a submersible actuator and has a plurality of blending zones or sections, as further described below.

FIGS. 1-17 show a liquid polymer or chemical activation system 1 that comprises a hollow chamber C having a first distal end DE1 and a second distal end DE2, wherein each distal end is opposite to each other. The first distal end DE1 of the hollow chamber C includes a top chamber flange 2 having one or more holes configured to receive one or more bolts, screws or fasteners S. Similarly, the second distal end DE2 of the hollow chamber C includes a bottom chamber flange 3 having one or more holes configured to receive one or more bolts, screws or fasteners S. The hollow chamber C may be circular in shape, as shown in FIGS. 1-9; but may have any other shape, as shown in FIGS. 10-17, where the chamber C has a squared shape.

Figure 1:
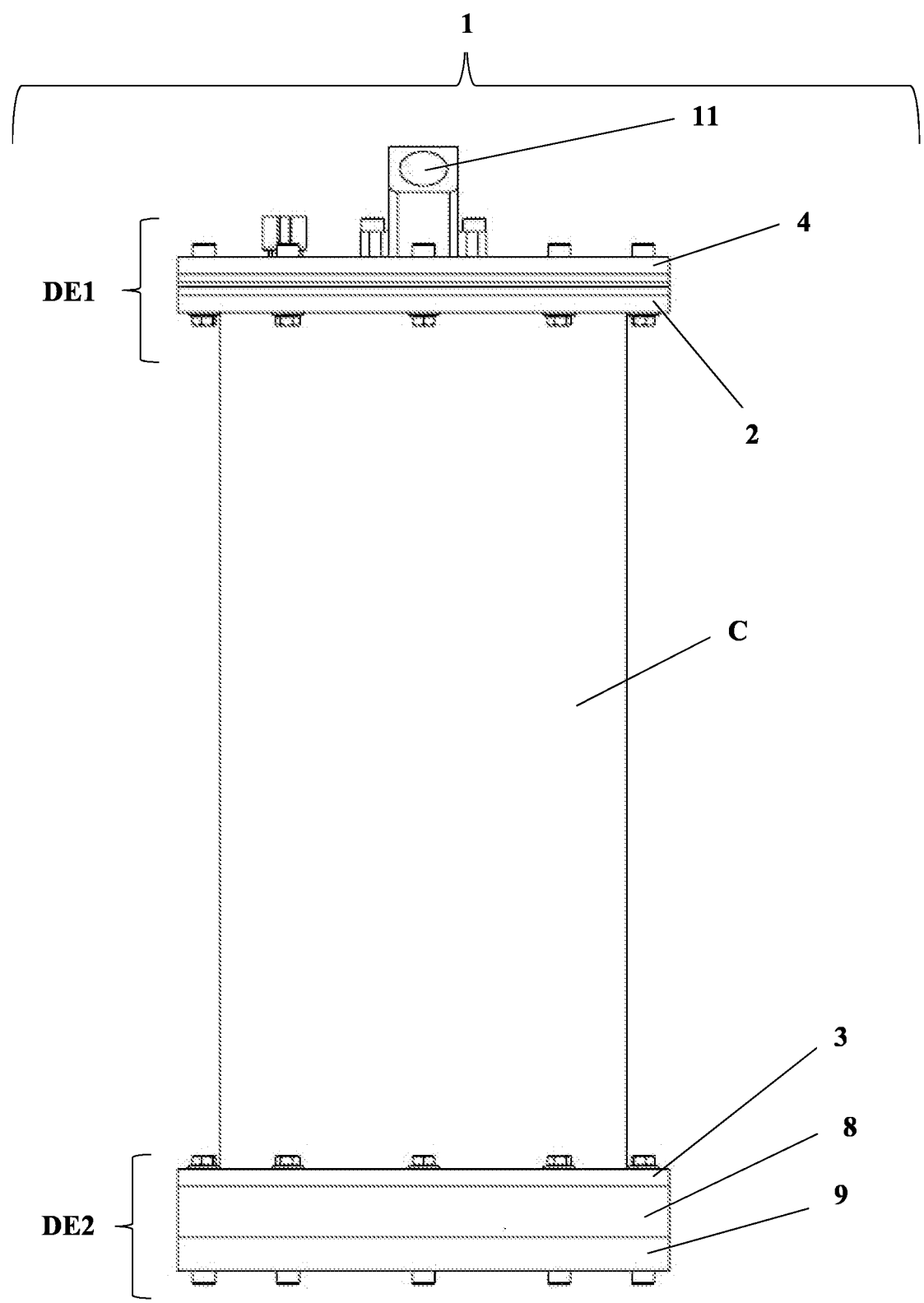
FIG. 1 shows the exterior components of a liquid polymer or chemical activation system that uses a submersible actuator, in accordance with the principles of the present invention.
Figure 2:
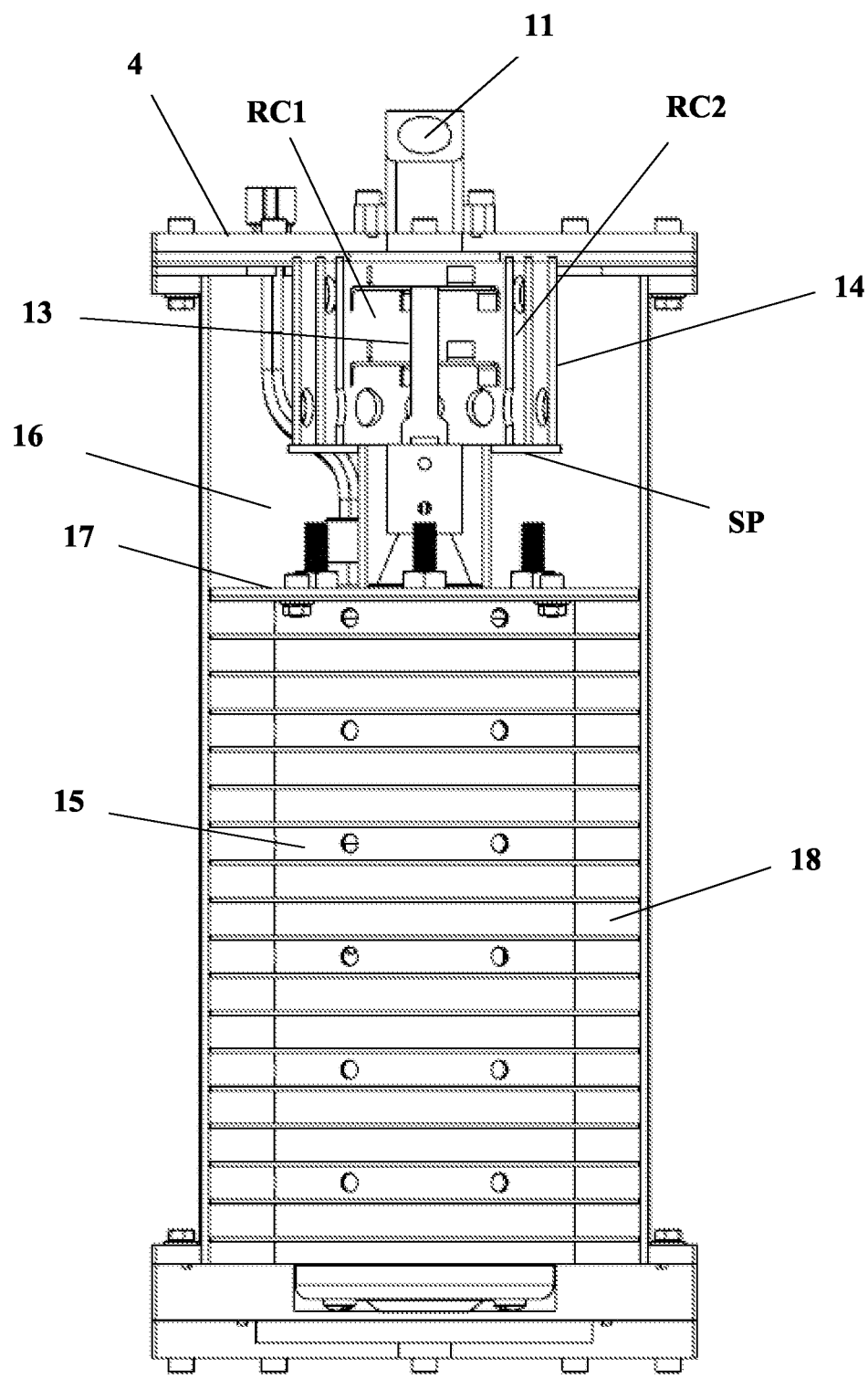
FIG. 2 shows the interior components of a liquid polymer or chemical activation system having a linear aging cup, in accordance with the principles of the present invention.
Figure 3:
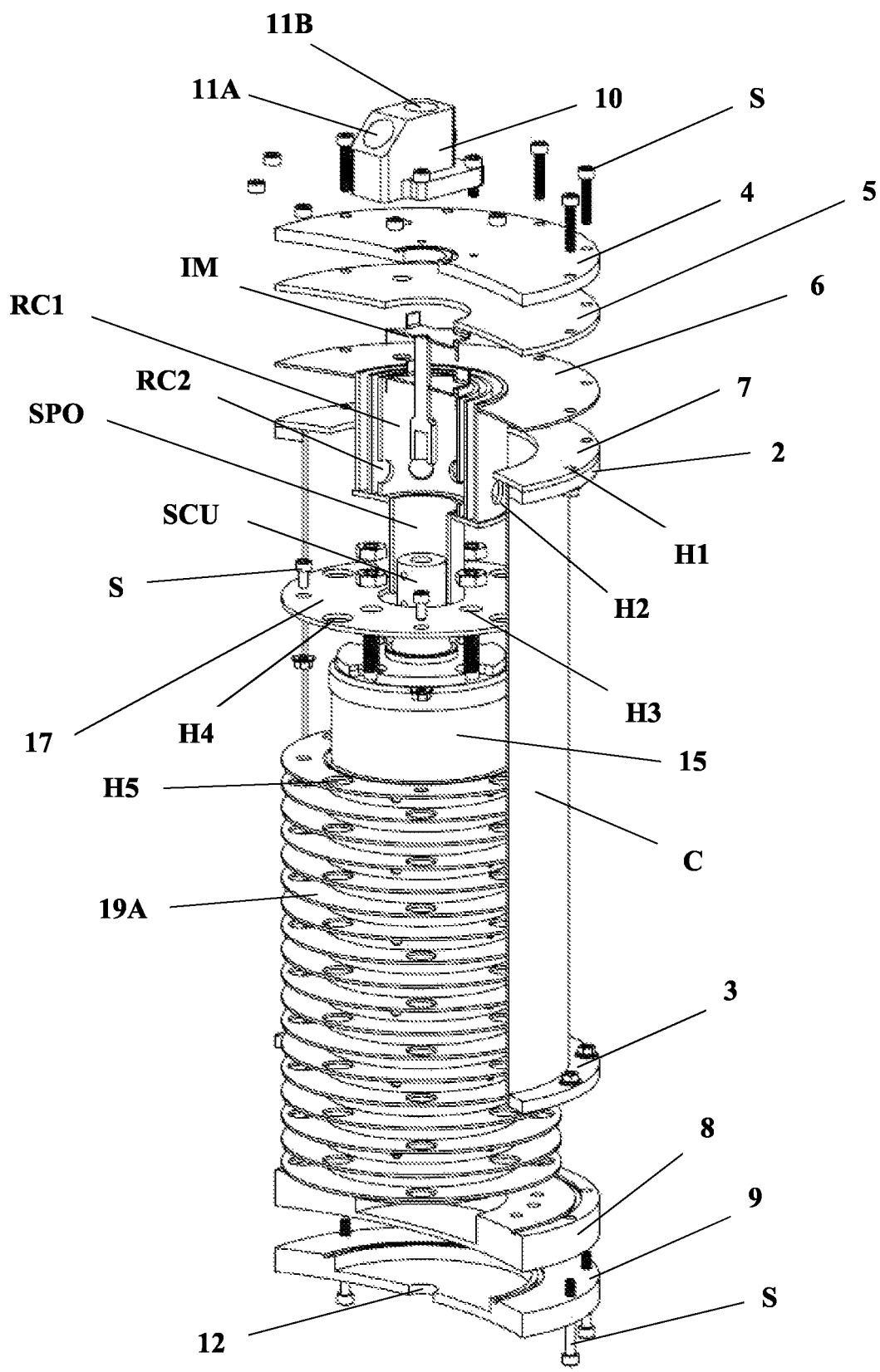
FIG. 3 shows an exploded view of the interior components of the liquid polymer or chemical activation system having a linear aging cup, in accordance with the principles of the present invention.

Additionally, as shown in FIGS. 2-3, the liquid polymer or chemical activation system 1 comprises a top cover plate 4, a first top gasket 5, a cup flange 6 and a second top gasket 7 connected to or secured to the top chamber flange 2 on the first distal end DE1 of the hollow chamber C via one or more bolts, screws or fasteners S. Each of the top cover plate 4, first top gasket 5, top cup flange 6, and second top gasket 7 has one or more holes H1 configured to receive the one or more bolts, screws or fasteners S. Furthermore, the one or more holes H1 on each of the previously mentioned individual elements (i.e., the top cover plate 4, the first top gasket 5, the top cup flange 6, and the second top gasket 7) are configured to align with each other and with the one or more holes on the top chamber flange 2, as shown in FIGS. 3, 5, 7, 9, 11, 13, 15 and 17. In this manner, the top cover plate 4, the first top gasket 5, the top cup flange 6, the second top gasket 7, and the top chamber flange 2 are tightly pressed against each other when secured via the one or more bolts, screws or fasteners S. Furthermore, as also shown in FIGS. 2-3, the liquid polymer or chemical activation system 1 further comprises a middle cover plate 8 and a bottom cover plate 9 secured to the bottom chamber flange 3 on the second distal end DE2 of the hollow chamber C via one or more bolts, screws or fasteners S. It should be noted that the middle plate 8 lies between the lower chamber flange 3 and the bottom cover plate 9. Moreover, each of the bottom cover plate 9 and middle plate 8 has one or more holes H1 configured to receive the one or more bolts, screws or fasteners S. Notably, the one or more holes H1 on each of the aforementioned individual elements (i.e., the bottom cover plate 9 and the middle plate 8) are configured to align with each other and with the one or more holes on the bottom chamber flange 3, as shown in FIGS. 3, 5, 7, 9, 11, 13, 15 and 17. In this manner, the bottom cover plate 9, middle plate 8 and bottom chamber flange 3 are tightly pressed against each other when secured via the one or more bolts, screws or fasteners S. Accordingly, the configuration of the liquid polymer or chemical activation system 1 creates a hollow space inside the chamber C that is flanked by the top cover plate 4 and the bottom cover plate 9.

As shown in FIGS. 1-17, the top cover plate 4 comprises a blending reactor 10 with at least one inlet 11 for receiving one or more substances, including, but not limited to, any liquid, solid particle or physical matter; and the bottom cover plate 9 comprises at least one outlet 12 for releasing the one or more substances. Moreover, as shown in FIG. 2, within the chamber C, the liquid polymer or chemical activation system 1 comprises an upper multistage mixing cup 14 comprising one or more retention cups RC configured to receive the one or more substances that were poured through the one or more inlet 11; at least one high shear mixer 13 for mixing the one or more substances in the multistage mixing cup 14; at least one submersible actuator 15 for actuating or rotating the high shear mixer 13; an intermediate blending section 16 for receiving the mixed one or more substances from the multistage mixing cup 14; a cup base flange 17 having one or more holes and a support platform for supporting one end of the multistage mixing cup 14; and a lower multistage aging cup 18 for further mixing of the one or more substances.

Figure 4:
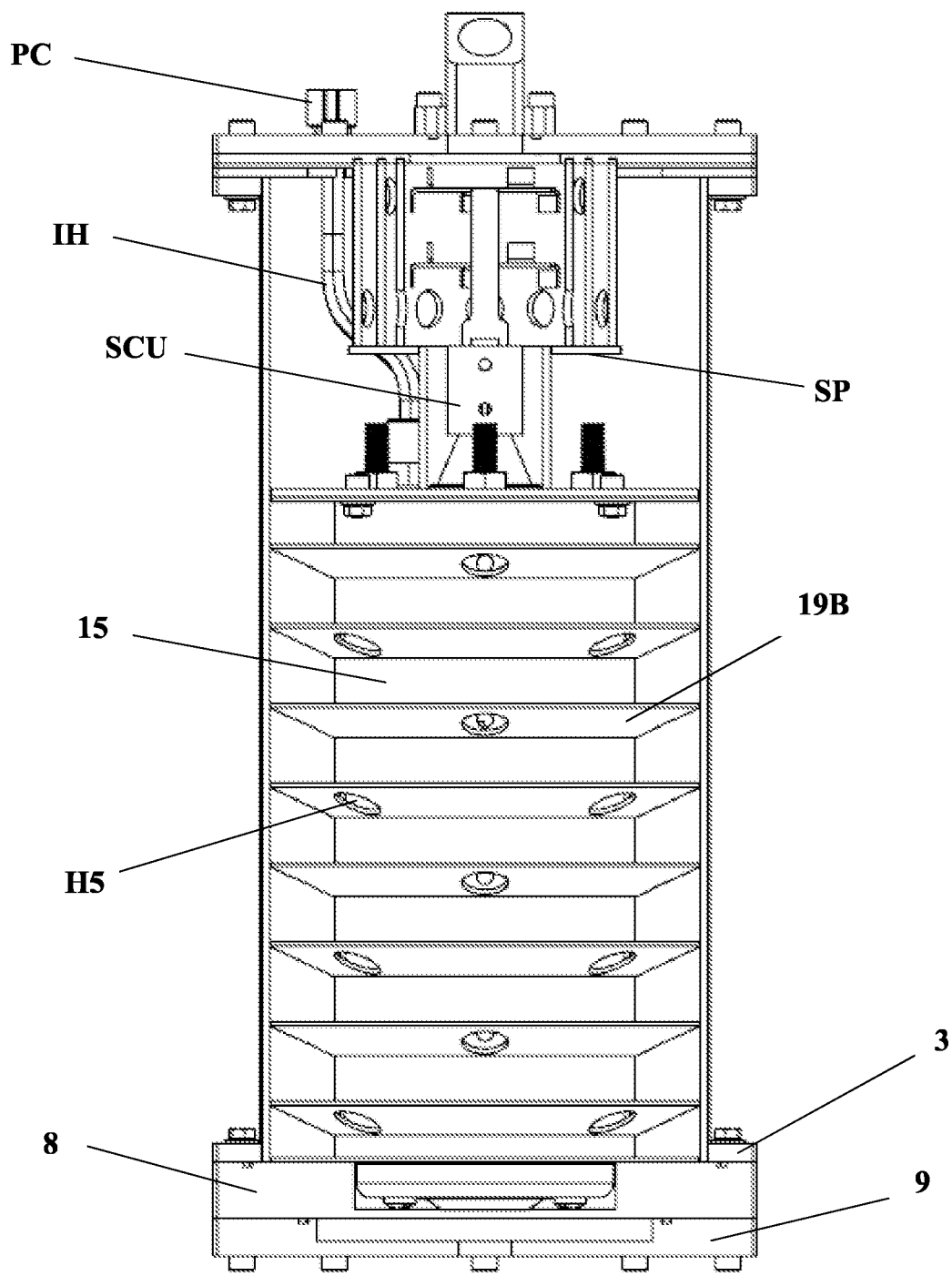
FIG. 4 shows the interior components of a liquid polymer or chemical activation system having a concave aging cup, in accordance with the principles of the present invention.
Figure 5:
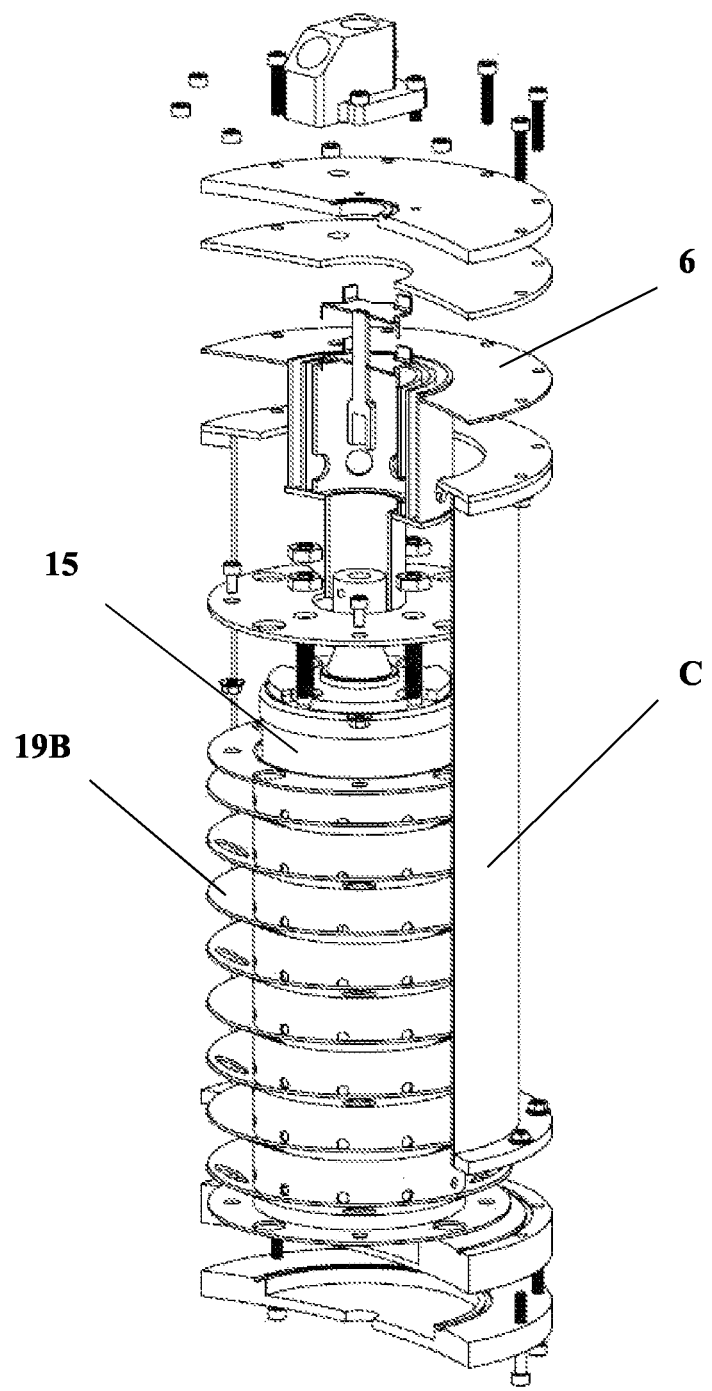
FIG. 5 shows an exploded view of the interior components of the liquid or chemical activation system having a concave aging cup, in accordance with the principles of the present invention.
Figure 6:
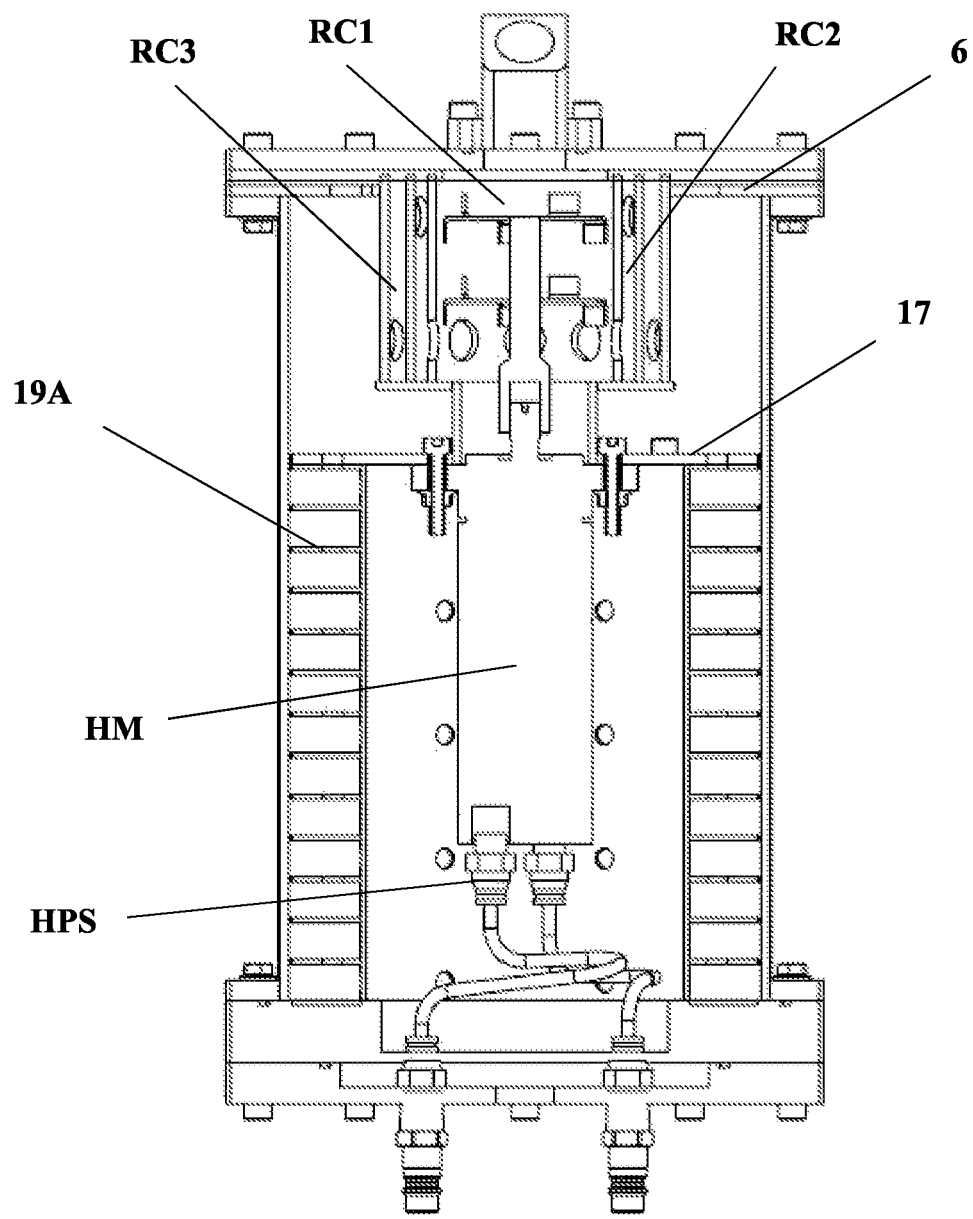
FIG. 6 shows the interior components of a liquid polymer or chemical activation system having a submersible pneumatic or hydraulic actuator with portions of the linear aging cup removed to better show the pneumatic or hydraulic actuator, in accordance with the principles of the present invention.
Figure 7:
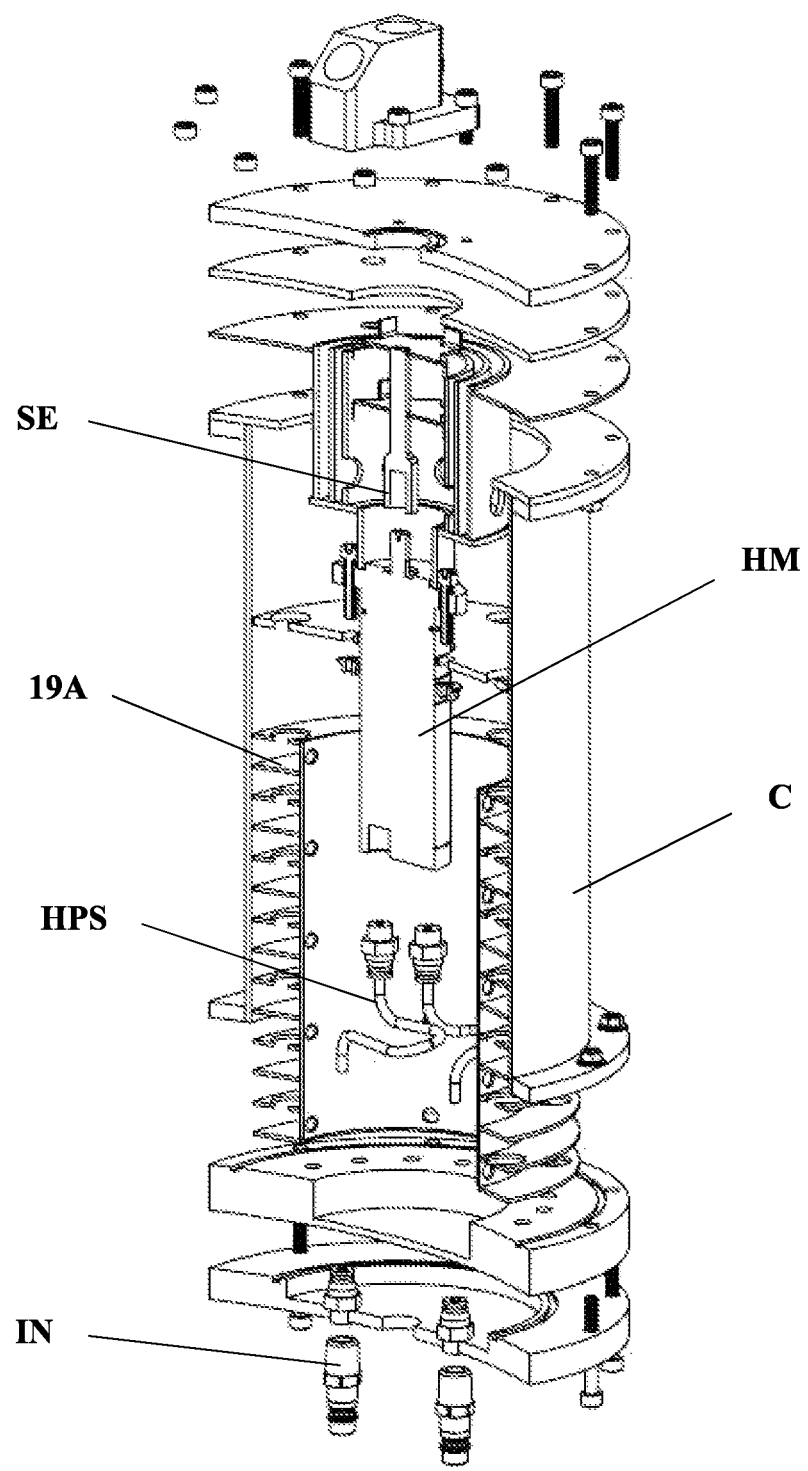
FIG. 7 shows an exploded view of the interior components of the liquid polymer or chemical activation system having a submersible pneumatic or hydraulic actuator and with portions of the linear aging cup removed to better show the pneumatic or hydraulic actuator, in accordance with the principles of the present invention.
Figure 8:
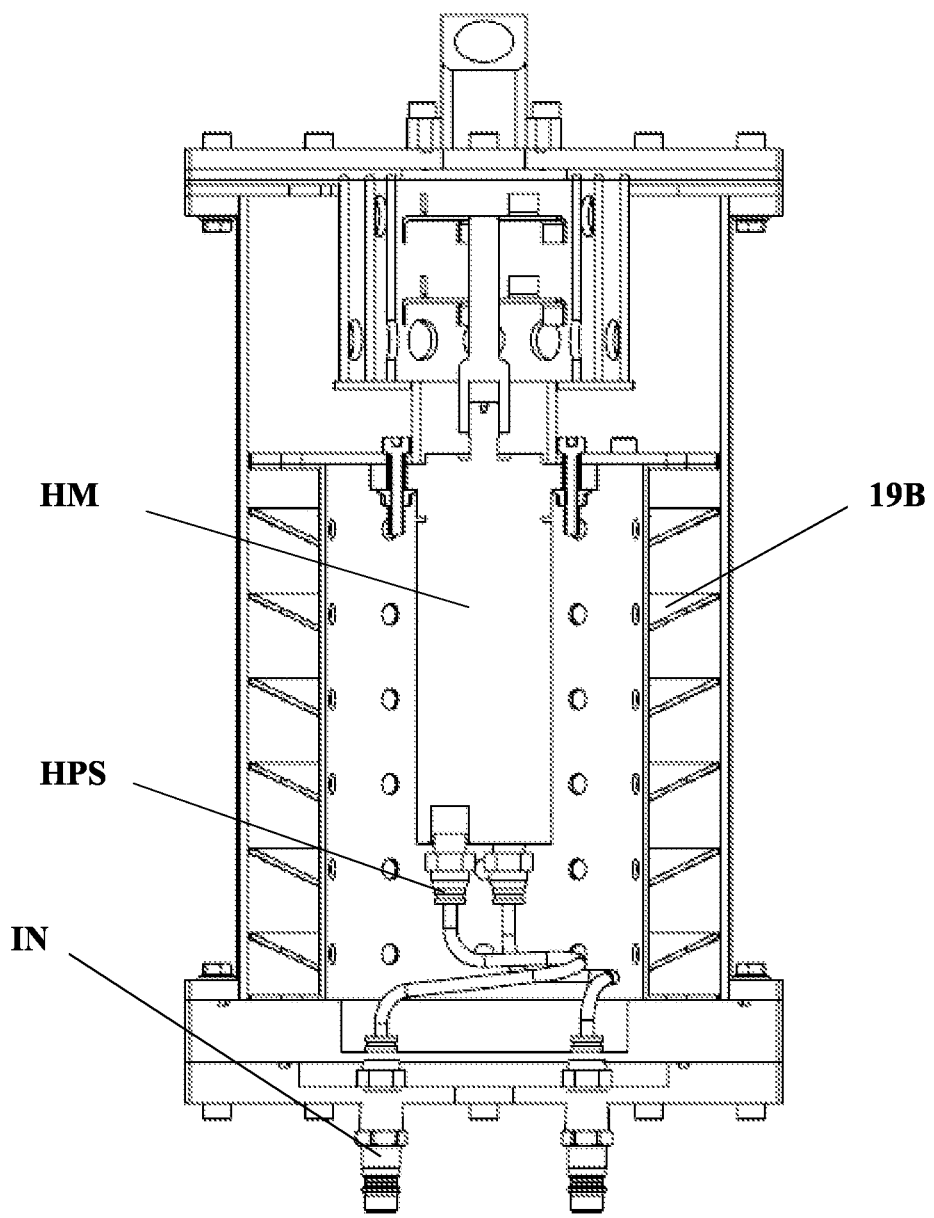
FIG. 8 shows the interior components of a liquid polymer or chemical activation system having a submersible pneumatic or hydraulic actuator with portions of the concave aging cup removed to better show the pneumatic or hydraulic actuator, in accordance with the principles of the present invention.
Figure 9:
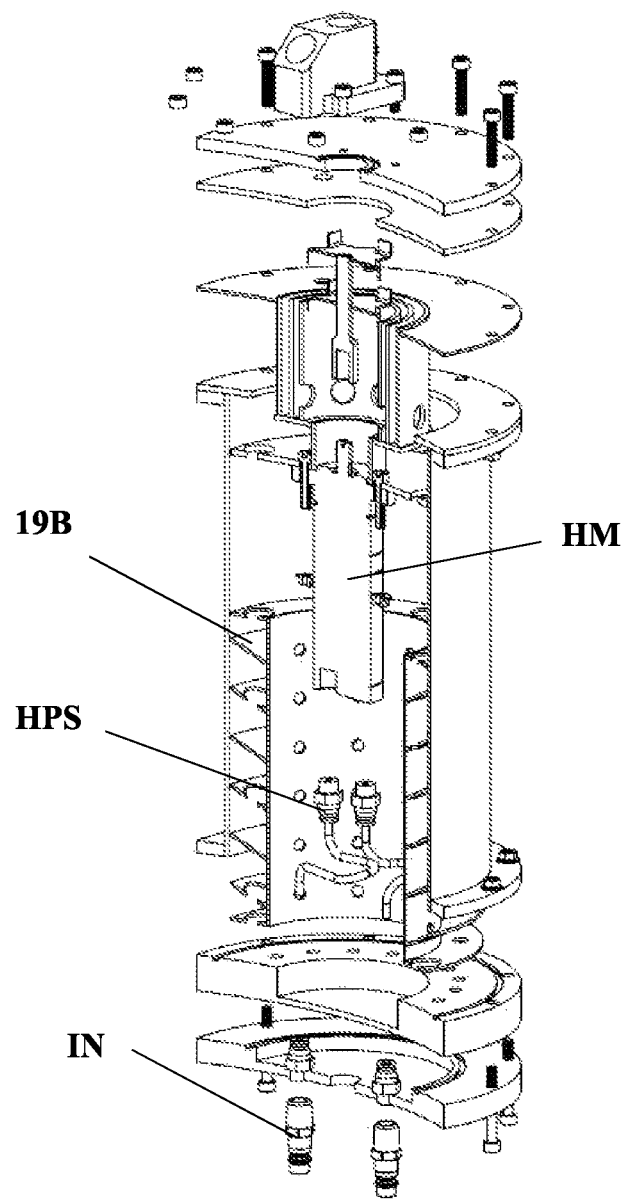
FIG. 9 shows an exploded view of the interior components of the liquid polymer or chemical activation system having a submersible pneumatic or hydraulic actuator with portions of the concave aging cup removed to better show the pneumatic or hydraulic actuator, in accordance with the principles of the present invention.
Figure 10:
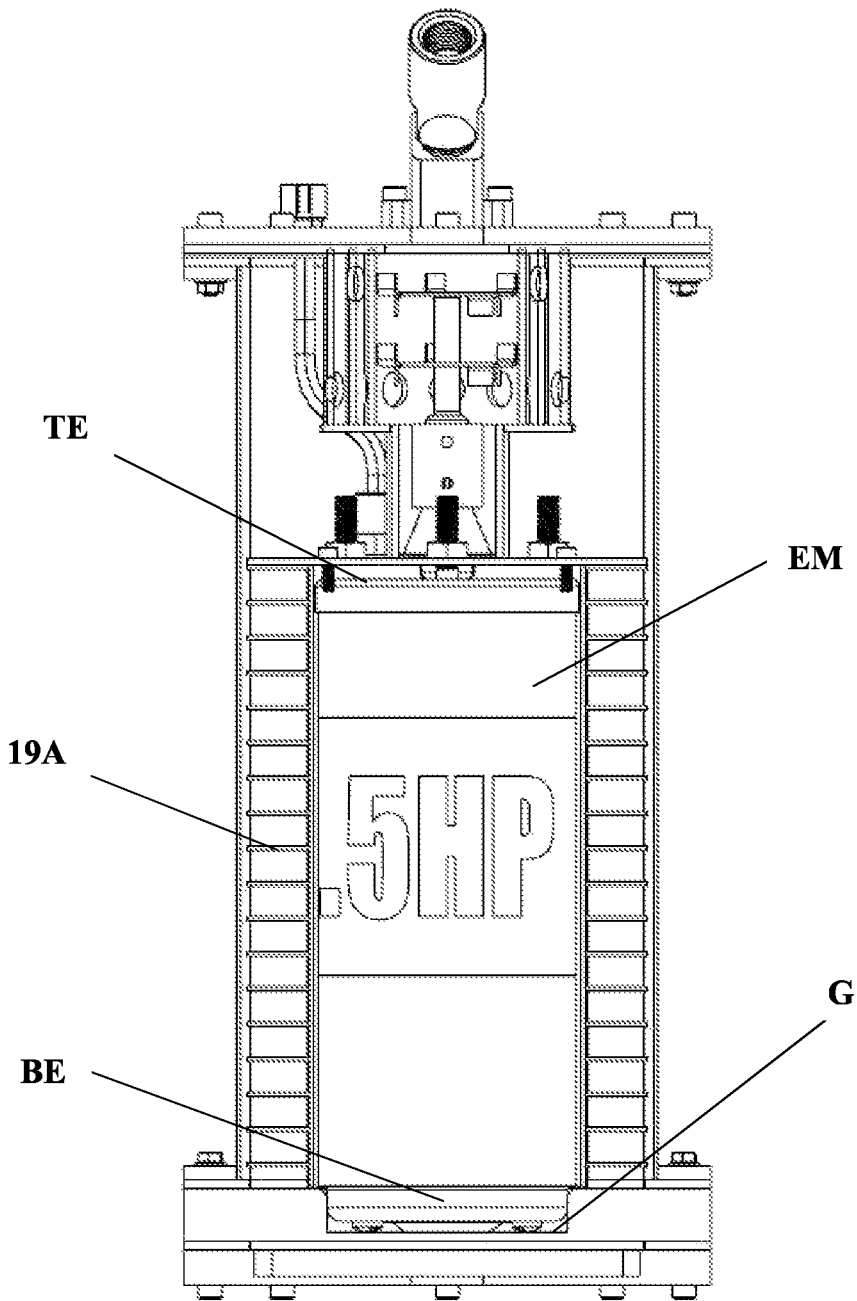
FIG. 10 shows the interior components of a liquid polymer or chemical system having a submersible electric actuator with portions of the linear aging cup removed to better show the electric actuator, in accordance with the principles of the present invention.
Figure 11:
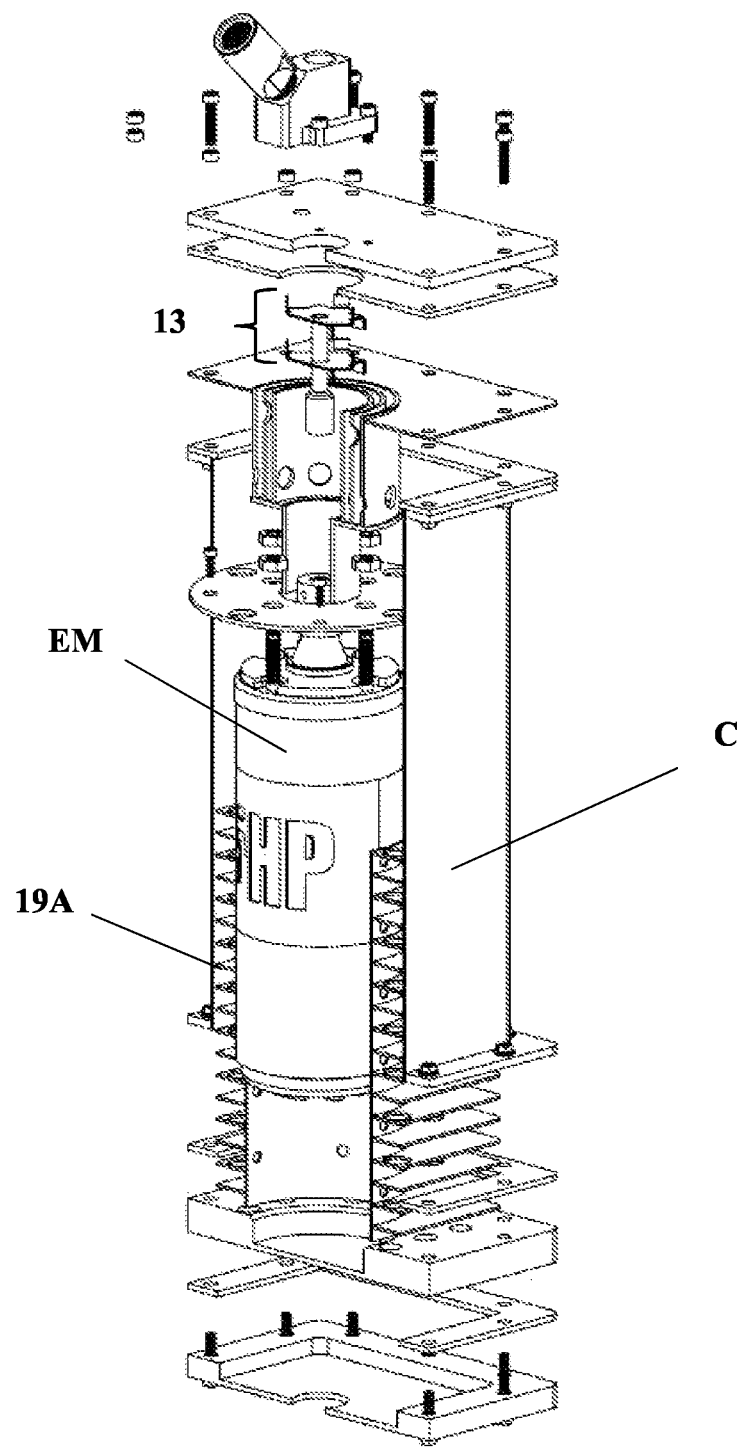
FIG. 11 shows an exploded view of the interior components of the liquid polymer or chemical activation system having a submersible electric actuator with portions of the linear aging cup removed to better show the electric actuator, in accordance with the principles of the present invention.
Figure 12:
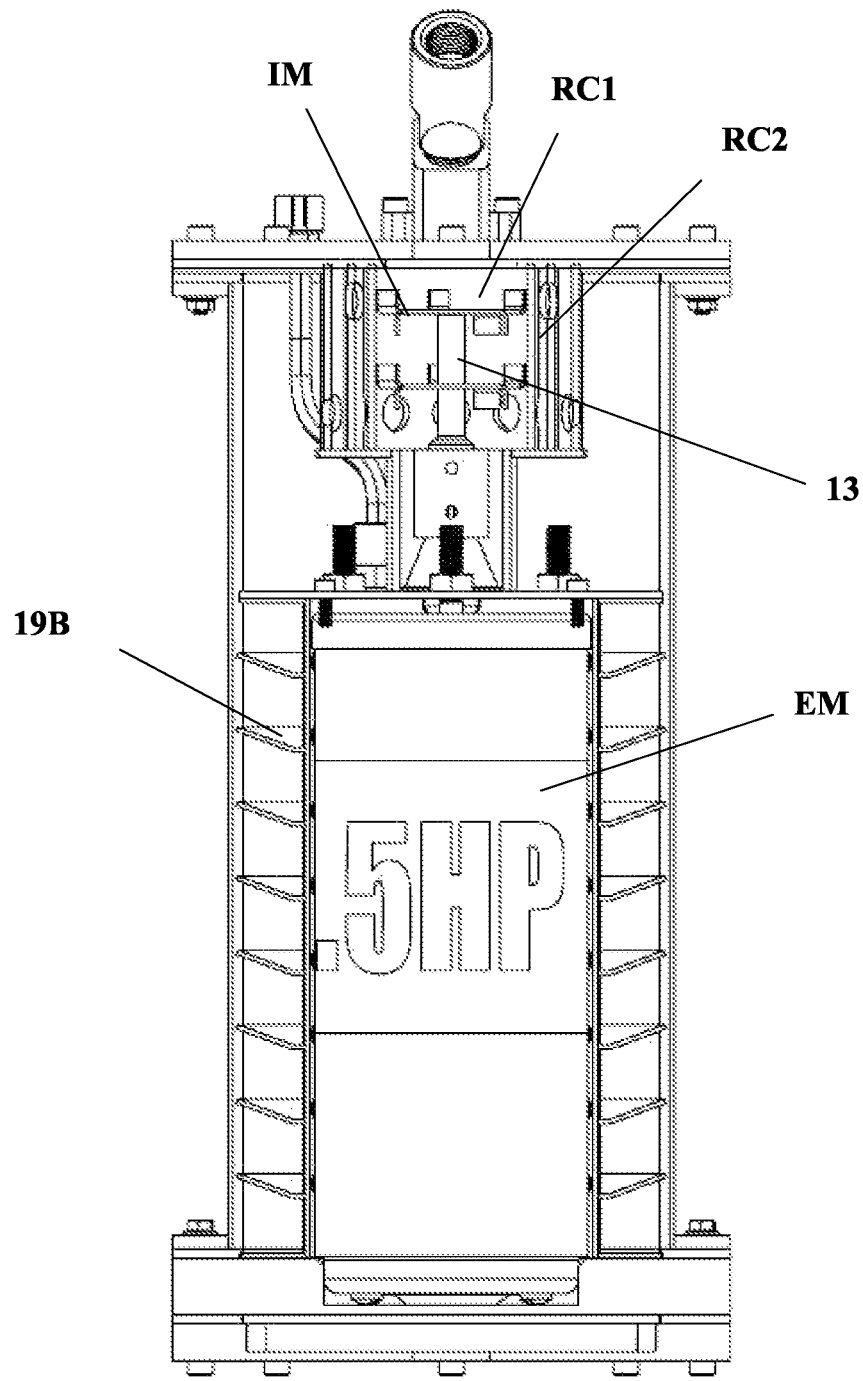
FIG. 12 shows the interior components of a liquid polymer or chemical activation system having a submersible electric actuator and with portions of the concave aging cup removed to better show the electric actuator, in accordance with the principles of the present invention.
Figure 13:
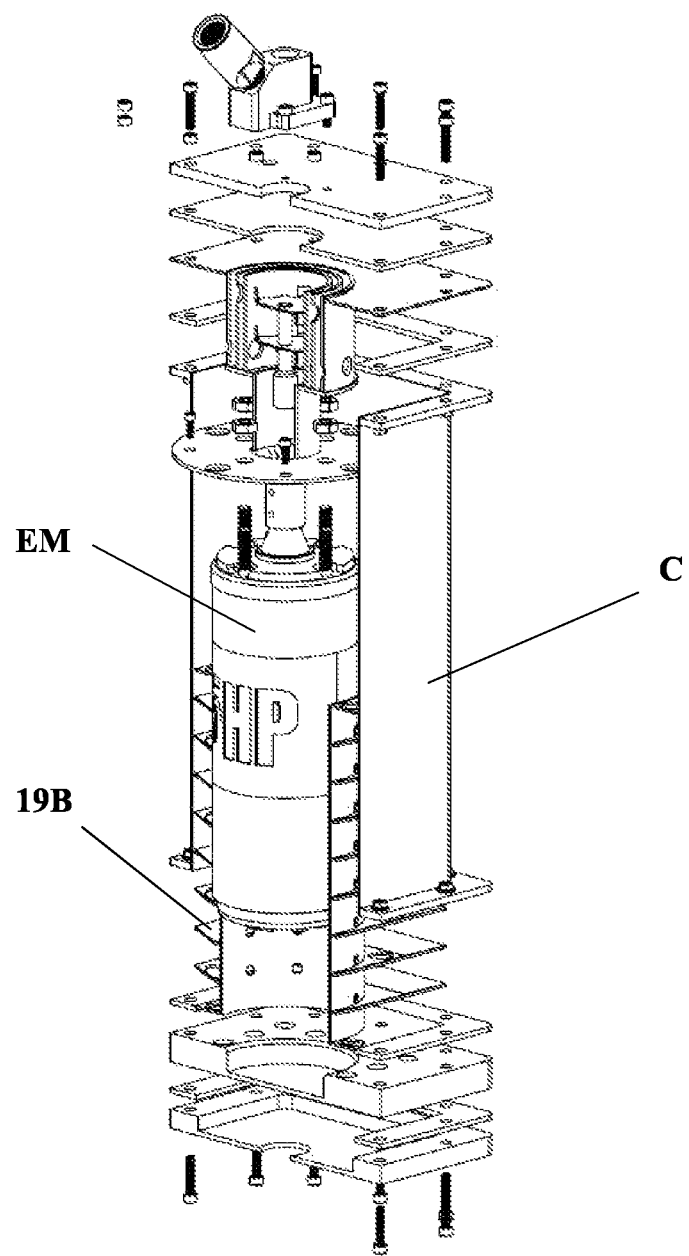
FIG. 13 shows an exploded view of the interior components of the liquid polymer or chemical activation system having a submersible electric actuator with portions of the concave aging cup removed to better show the electric actuator, in accordance with the principles of the present invention.
Figure 14:
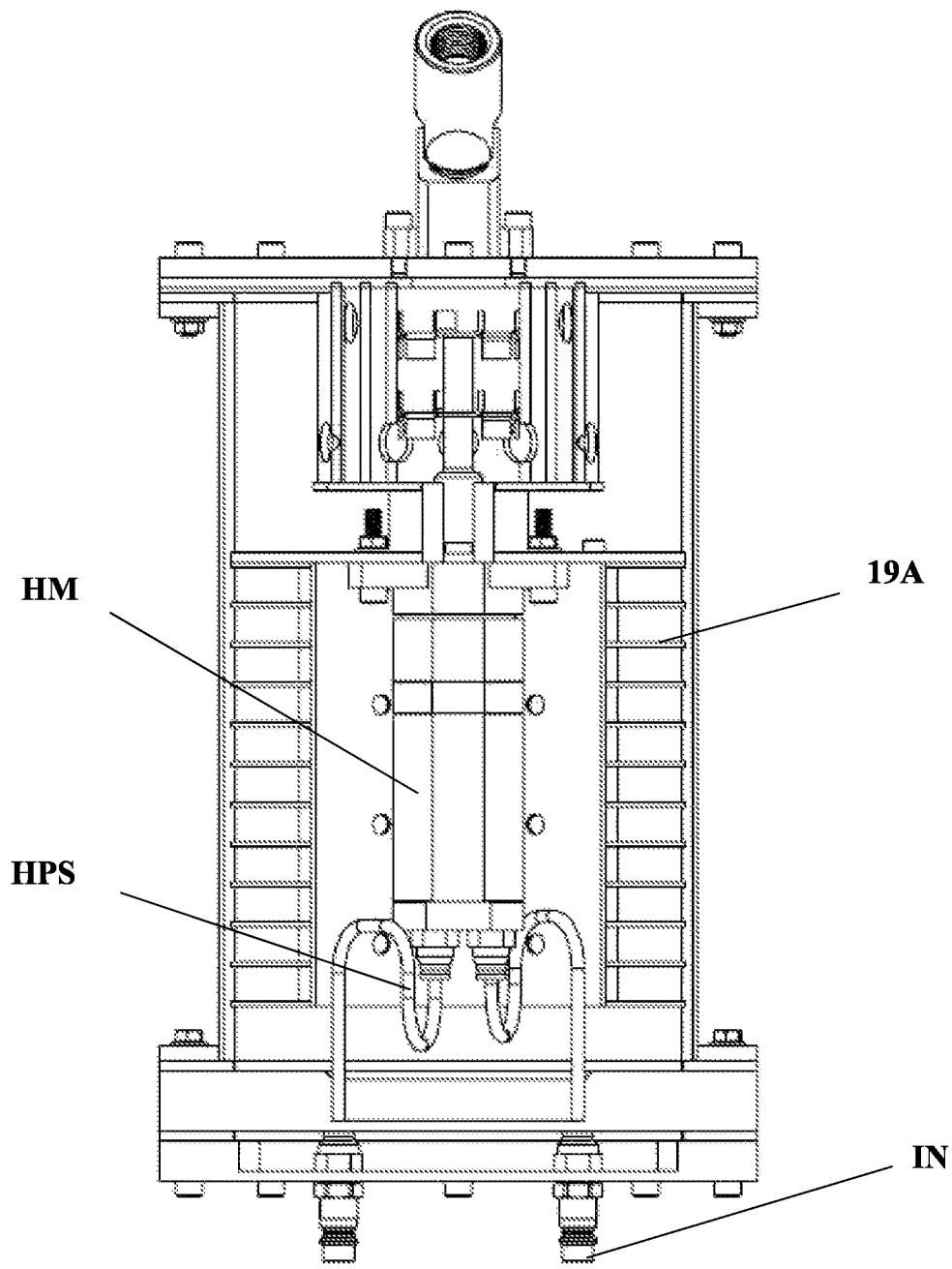
FIG. 14 shows the interior components of a liquid polymer or chemical activation system in which the linear aging cup and chamber have a squared shape, in accordance with the principles of the present invention.
Figure 15:
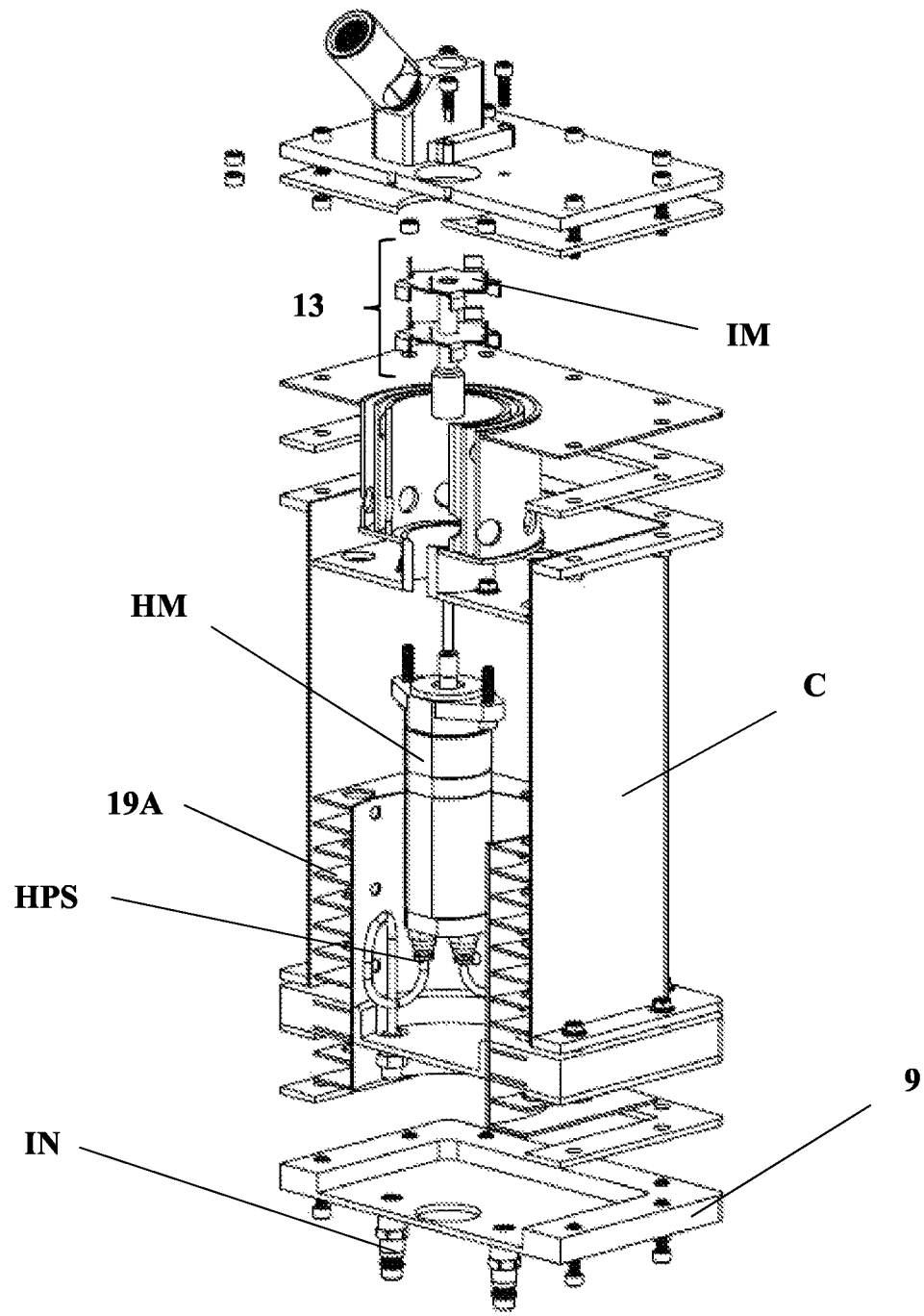
FIG. 15 shows an exploded view of the interior components of the liquid polymer or chemical activation system in which the linear aging cup and chamber have a squared shape, in accordance with the principles of the present invention.
Figure 16:
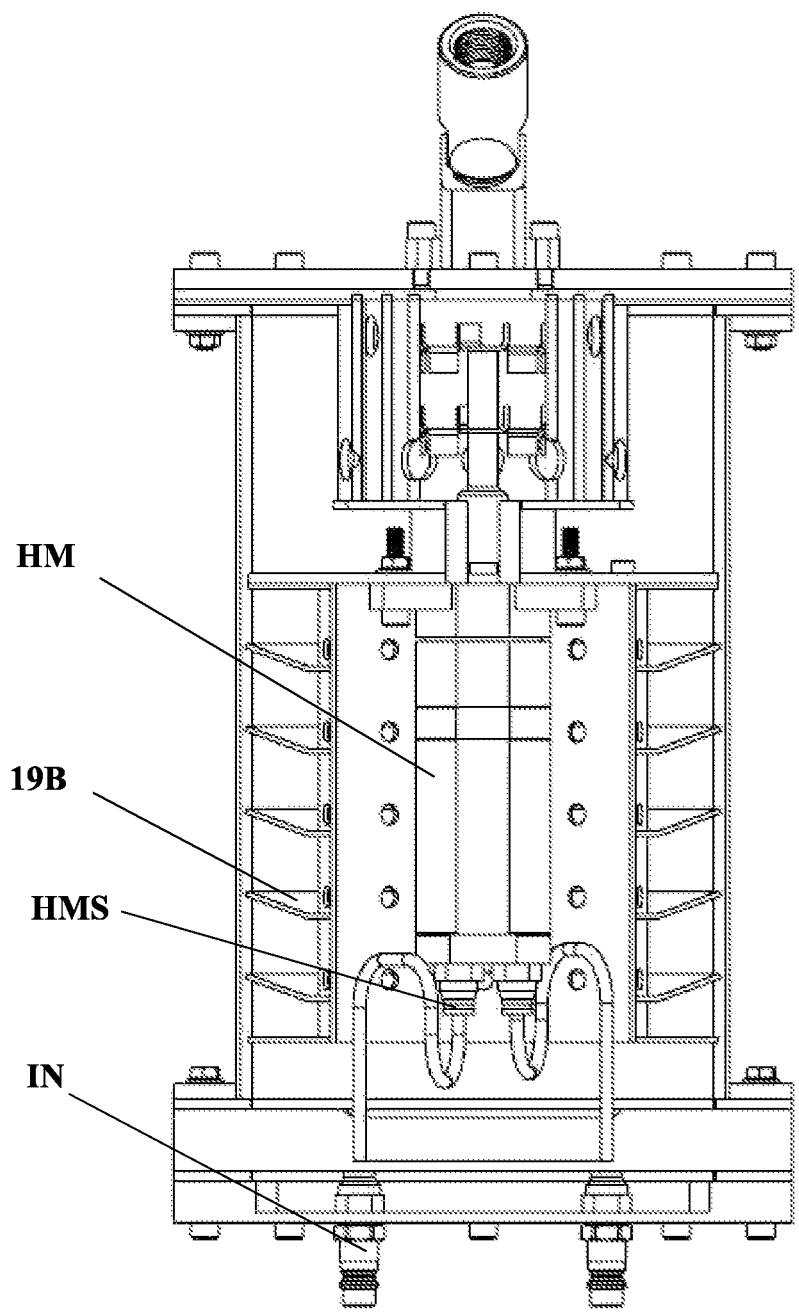
FIG. 16 shows the interior components of a liquid polymer or chemical activation system in which the concave aging cup and chamber have a squared shape, in accordance with the principles of the present invention.

The upper multistage mixing cup 14 constitutes the first blending zone of the liquid polymer or chemical activation system 1. As previously noted, the upper multistage mixing cup 14 comprises one or more retention cups RC configured to receive the one or more substances, as particularly shown in FIG. 6. The upper multistage mixing cup 14 is preferably subdivided into at least a first retention cup RC1 and a second retention cup RC2, wherein the second retention cup RC2 encircles or encloses the first retention cup RC1. For embodiments having more than two retention cups, each subsequent retention cup encircles or encloses the previous retention cup. For example, a third retention cup RC3 would encircle the second retention cup RC2, a fourth retention cup would encircle the third retention cup, and so on. It should be noted that a top portion of the upper multistage mixing cup 14 is encircled by the cup flange 6, as shown in FIG. 3. When the one or more substances enter the one or more inlet 11, the substances are led into and received by the first retention cup RC1. In embodiments having more than one inlet 11A, 11B, the one or more substances come into contact with each other for the first time in the blending reactor 10, and then flow into the first retention cup RC1. Once inside the first retention cup RC1 the one or more substances are mixed by the high shear mixer 13. As shown in FIGS. 12 and 15, the high shear mixer 13 may include at least one impeller IM to assist in mixing the one or more substances before reaching the second retention cup RC2, as further discussed below. The impeller IM and high shear mixer 13 are attached to a shaft extension SE which in turn is coupled to the submersible actuator 15 via a shaft coupling unit SCU. The submersible actuator 15 actuates the rotation of the shaft extension SE and consequently the rotation of the impeller IM and high shear mixer 13. It should be noted that the submersible actuator 15 may be a submersible electric motor or actuator EM, as shown in FIGS. 2-5 and 7-13; or a submersible pneumatic or hydraulic motor HM, as shown in FIGS. 6-9 and 14-17. For embodiments having an electric motor or actuator EM, the liquid polymer or chemical activation system 1 also comprises at least one electric power connector PC on the top cover plate 4, that comprises an insulated harness IH connected to the submersible actuator 15, as shown in FIG. 4. The horsepower of the submersible electric motor or actuator EM should preferably be between 0.3 HP and up to 300 HP. In some embodiments, however, the horsepower range may be higher or lower. For embodiments having a submersible pneumatic or hydraulic motor HM, as shown in FIGS. 6, 7, 8, 9, 14, 15, 16 and 17, the liquid polymer or chemical activation system 1 is connected to a pneumatic or hydraulic HPS power source that provides power to the pneumatic or hydraulic motor HM via inputs IN on the bottom cover plate 9, which in turn are connected to the submersible pneumatic or hydraulic motor HM.

It should be noted that, as shown in FIG. 2, a first end of the first and second retention cups RC1, RC2 are in contact with the portion of the top cover plate 4 within the chamber C, whereas a second end of the first and second retention cups RC1, RC2 are resting or supported by a support platform SP of the cup base flange 17. The first retention cup RC1 further includes one or more holes 112 for releasing the mixed one or more substances into the second retention cup RC2, which as previously noted, encircles or encloses the first retention cup RC1. Once the one or more substances are received and further mixed in the second retention cup RC2, the one or more substances are flow, via one or more holes 112 in the second retention cup RC2, into the intermediate blending stage 16. The intermediate blending section 16 constitutes the second blending zone of the liquid polymer or chemical activation system 1. It should be noted that the cup flange 6 forms the celling of the intermediate blending section 16, as shown in FIG. 2. Once in the intermediate blending section 16 the one or more substances come into contact with the cup base flange 17.

As shown in FIG. 3, the cup base flange 17 comprises one or more holes 113 configured to receive one or more bolts, screws or fasteners S that are used to connect or secure the cup base flange 17 to the submersible actuator 15 and to the plurality of rings 19 that form part of the multistage aging cup 18, as further described below. Moreover, the cup base flange 17 comprises one or more holes 114 configured to lead or provide access to the one or more substances into the lower multistage aging cup 18. As previously noted, the cup base flange 17 includes a support platform SP for supporting the retention cups RC of the upper multistage mixing cup 14. The support platform SP has at least one opening SPO that provides the shaft coupling unit SCU with access to the submersible actuator 15. It should also be noted that the submersible actuator 15 has a first end TE and a second end BE. On the first end TE the submersible actuator 15 is connected to the cup base flange 17 via one or more bolts, screws or fasteners S; whereas the second end BE of the submersible actuator 15 is fixedly resting on a groove G on the middle plate 8 that is configured to receive the second end BE of the submersible actuator 15. As such, the middle plate 8 serves as a support base for the second end BE of the submersible actuator 15. Lastly, it must be noted that the middle plate 8 is connected to the bottom cover plate 9 which, in turn, has at least one outlet 12 for releasing the one or more substances.

Figure 17:
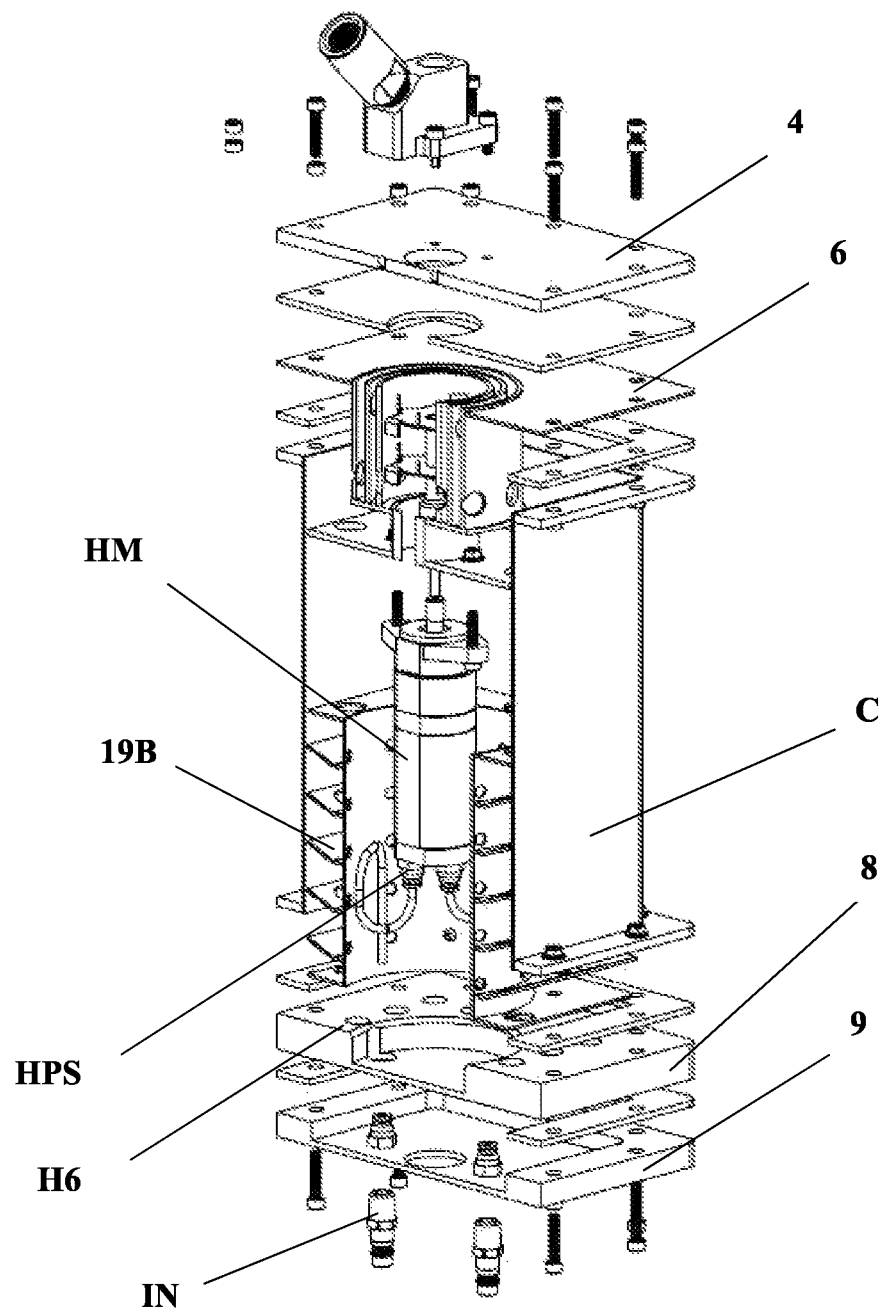
FIG. 17 shows an exploded view of the interior components of the liquid polymer or chemical activation system in which the concave aging cup and chamber have a squared shape, in accordance with the principles of the present invention.
Figure 18:
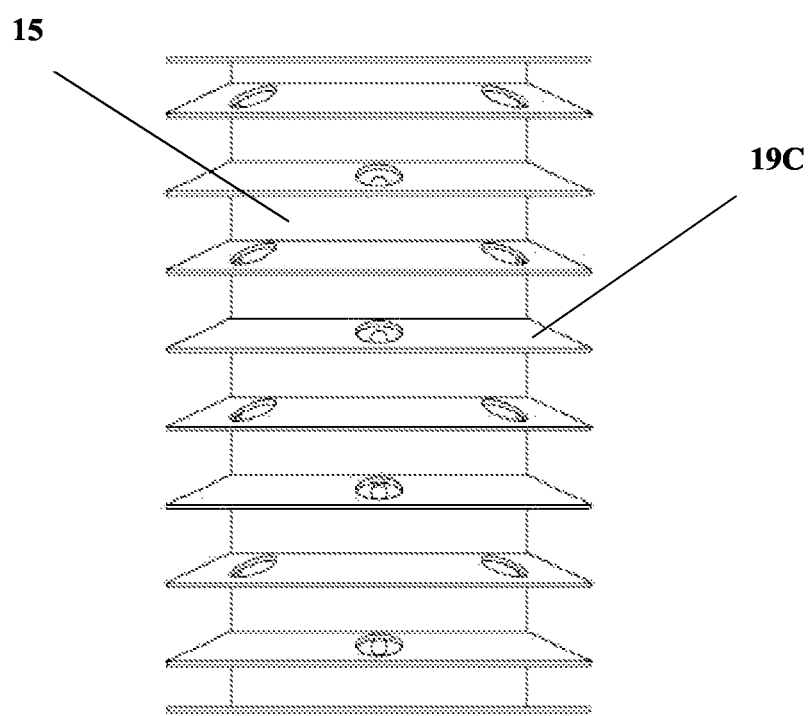
FIG. 18 shows a convex aging cup of the liquid polymer or chemical activation system, in accordance with the principles of the present invention.

As noted above, once the mixed one or more substances reach the cup base flange 17, the substances are led (by the flow of the one or more substances), via the one or more holes 114, into the lower multistage aging cup 18 (which is where the submersible actuator 15 is located). The lower multistage aging cup 18 constitutes the third blending zone of the liquid polymer or chemical activation system 1. The lower multistage aging cup 18 comprises a plurality of rings 19 surrounding the submersible actuator 15, in which the rings 19 are aligned one on top of the other. The rings 19 may be linear 19A (as shown in FIGS. 2, 3, 6, 7, 10, 11, 14, and 15), concave 19B (as shown in FIGS. 4, 5, 8, 9, 12, 13, 16, and 17), or convex 19C (as shown in FIG. 18) in relation to the submersible actuator 15; and can be manufactured from any strong durable material such as plastic, metal, etc. As previously noted, the rings 19 are secured to the cup base flange 17 via one or more bolts, screws or fasteners S. Moreover, each ring in the plurality of rings 19 includes one or more holes 115. The one or more holes 115 allow the one or more substances to further mix as the substances move down along the lower multistage aging cup 18 until it reaches the middle cover plate 8. As shown in FIG. 17, the middle cover plate 8 comprises one or more holes 116 which lead the mixed one or substances directly into the bottom cover plate 9. The bottom cover plate 9 constitute the fourth and final blending zone of the liquid polymer or chemical activation system 1 before the mixed one or more substances are released through the at least one outlet 12.

Figure 19:
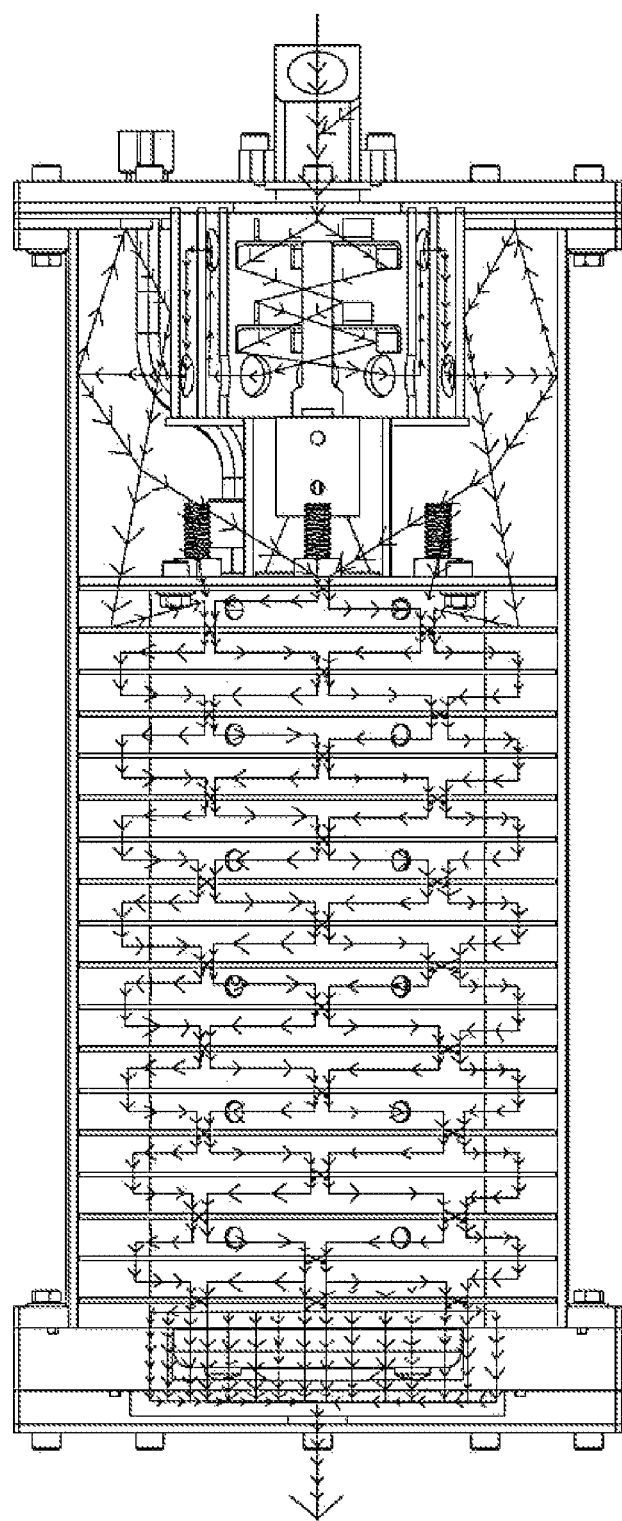
FIG. 19 shows the flow of the one or more substances as they move along the liquid polymer or chemical activation system, in accordance with the principles of the present invention.

The flow of the one or more substances along the liquid polymer or chemical activation system 1 (from the moment the substances enter through inlet 11 to the moment they are released through outlet 12) is shown in FIG. 19. Furthermore, the one or more holes 115 in the plurality of rings 19 preferably do not align with other holes in the plurality of rings 19. This configuration provides further mixing of the one or more substances. Notwithstanding, the present disclosure also contemplates a lower multistage aging cup 18 in which the one or more holes 115 in the plurality of rings 19 align with other holes in the plurality of rings 19.

As shown in FIGS. 20-25, the liquid polymer or chemical activation system 1 may also include a dry substance funnel SF attached to the blending reactor 10 via a dry substance interconnection inlet 20, which is a tube that connects the dry substance funnel SF to the blending reactor 10. A gasket SFG may be placed between the substance funnel SF and dry substance interconnection inlet 20 to provide a better connection between the dry substance funnel SF and the dry substance interconnection inlet 20. The dry substance funnel SF may be used to pour non-liquid substances, such has powdered or solid substances, into the polymer activation system 1 in order to mix it with other substances. It is important to note that the narrow portion of the dry substance funnel SF is the portion that attaches to the dry substance inlet 20. On the other hand, a hopper or container 21 may be attached, via one or more bolts, screws or fasteners S, to the wide portion of the dry substance funnel SF. The hopper or container 21 can be used to pour a larger portion of dry substances into the liquid polymer or chemical activation system 1, and may include a closeable door CD in order to provide or close user access to the dry substance funnel SF. Once a dry substance is poured through the dry substance funnel SF, the dry substance is led, via the dry substance interconnection inlet 20, to blending reactor 10 where it then reaches the first retention cup and is mixed with other substances (liquid or solid) in accordance with the principles of the present invention, as already discussed herein.

Figure 20:
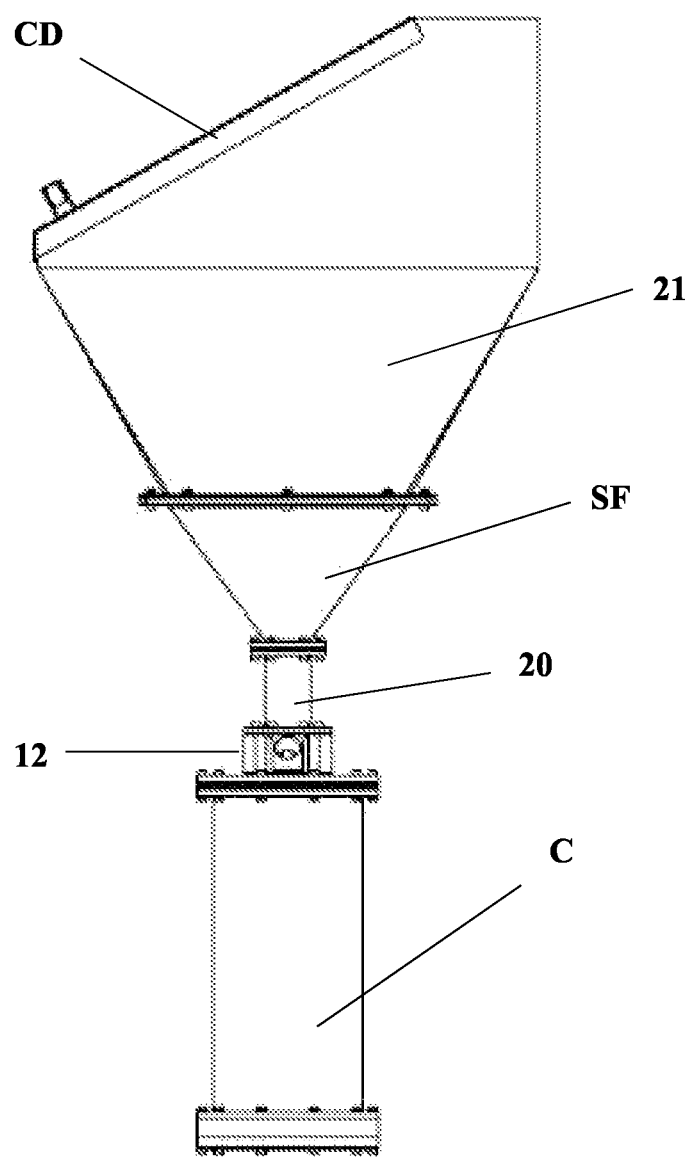
FIG. 20 shows a first embodiment of a dry substance funnel attached to the liquid polymer or chemical activation system, in accordance with the principles of the present invention.
Figure 21:
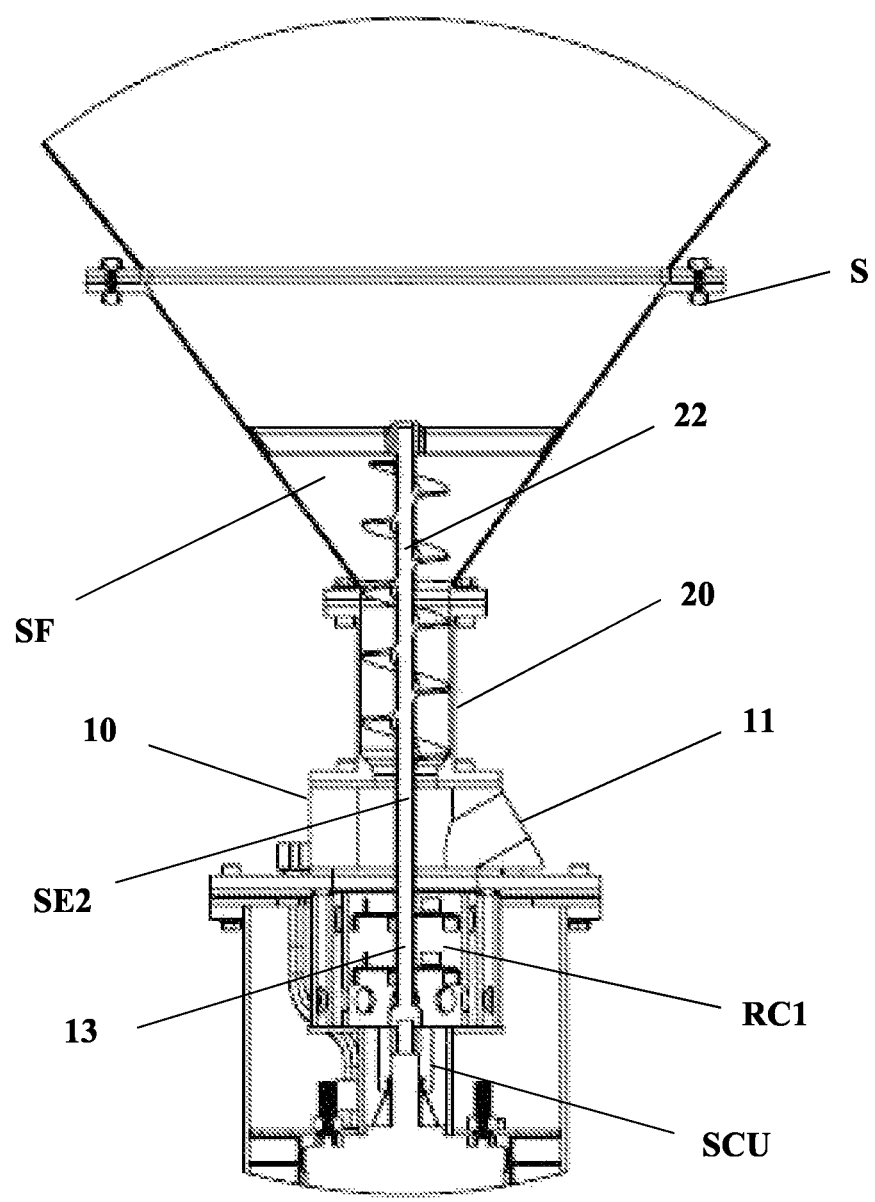
FIG. 21 shows an up-close view of the internal components of the first embodiment of a dry substance funnel.
Figure 22:
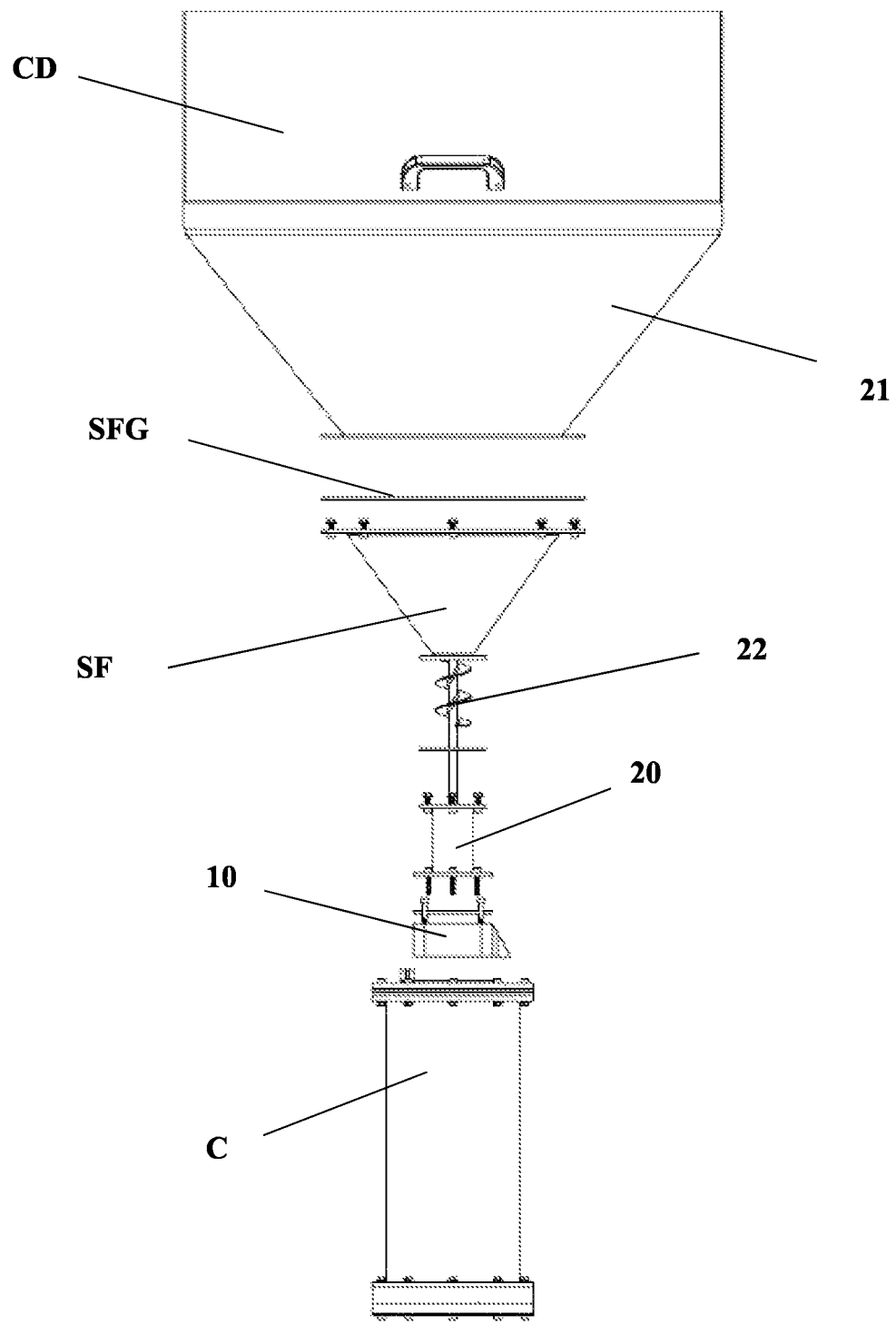
FIG. 22 shows an exploded view of the components of the first embodiment of the dry substance funnel attached to the liquid polymer or chemical activation system, in accordance with the principles of the present invention.

The present invention contemplates two embodiments in which the dry substance funnel SF may be used. In one embodiment, the dry substance funnel SF comprises a screw feeder 22 for initial mixing of the dry substance, as shown in FIGS. 20-22. In this first embodiment the liquid polymer or chemical activation system 1 comprises a longer a shaft extension SE2 that extends from the shaft coupling unit SCU all the way to the narrow portion of the dry substance funnel SF. As such, the portion of the shaft extension SE2 in the first retention cup RC1 includes the high shear mixer 13 and impeller IM; while the portion of the shaft extension SE2 in the narrow portion of the dry substance funnel SF includes the screw feeder 22. As the shaft extension SE2 rotates, the screw feeder 22 also rotates in order to begin initial mixing of the dry substance. The rotation of the screw feeder 22 is slow on order to control the dosage of the dry substances. Once the dry substance reaches the first retaining cup RC1, the substance mixes with the other substance poured through inlet 11.

Figure 23:
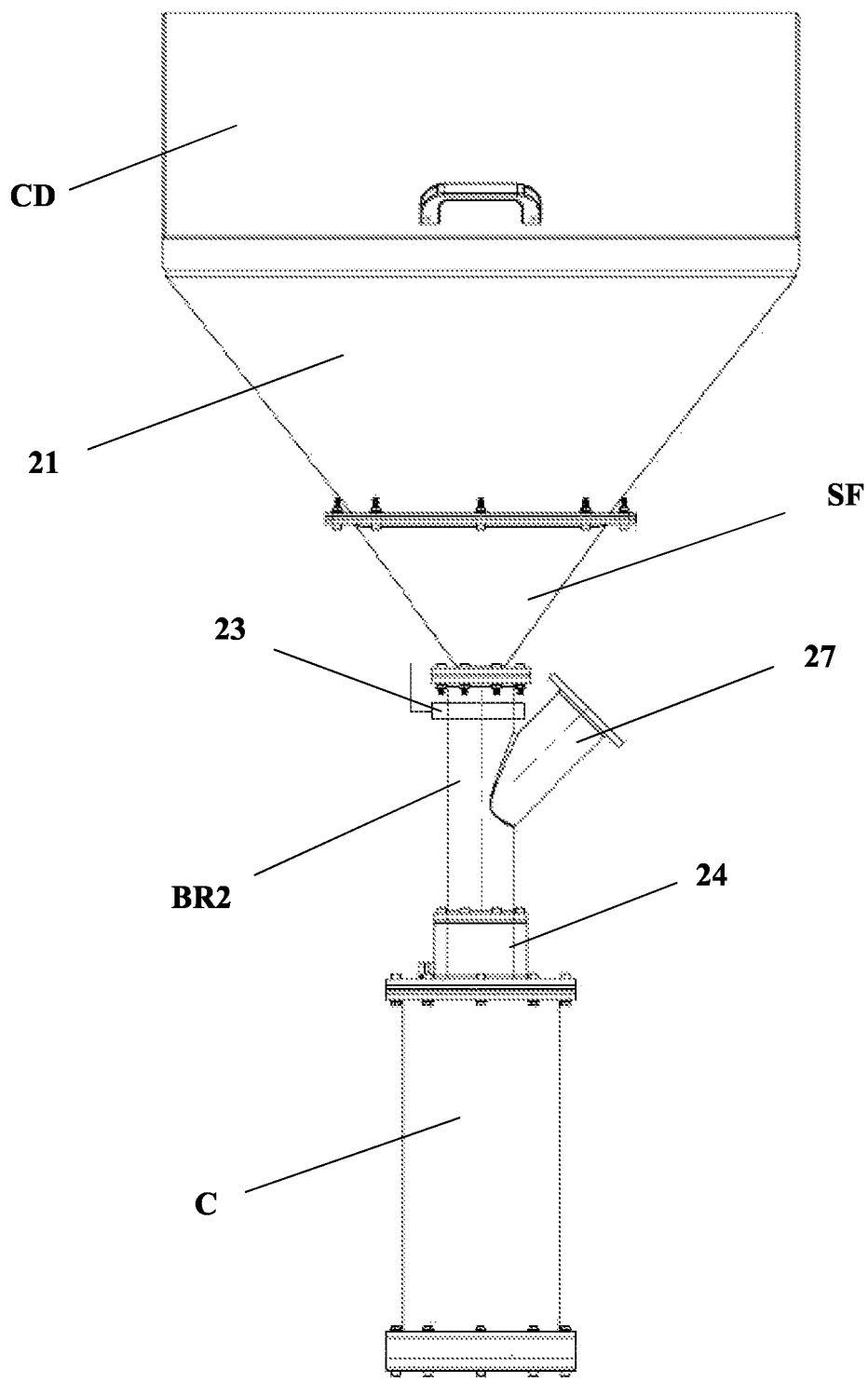
FIG. 23 shows a second embodiment of a dry substance funnel attached to the liquid polymer or chemical activation system, in accordance with the principles of the present invention.
Figure 24:
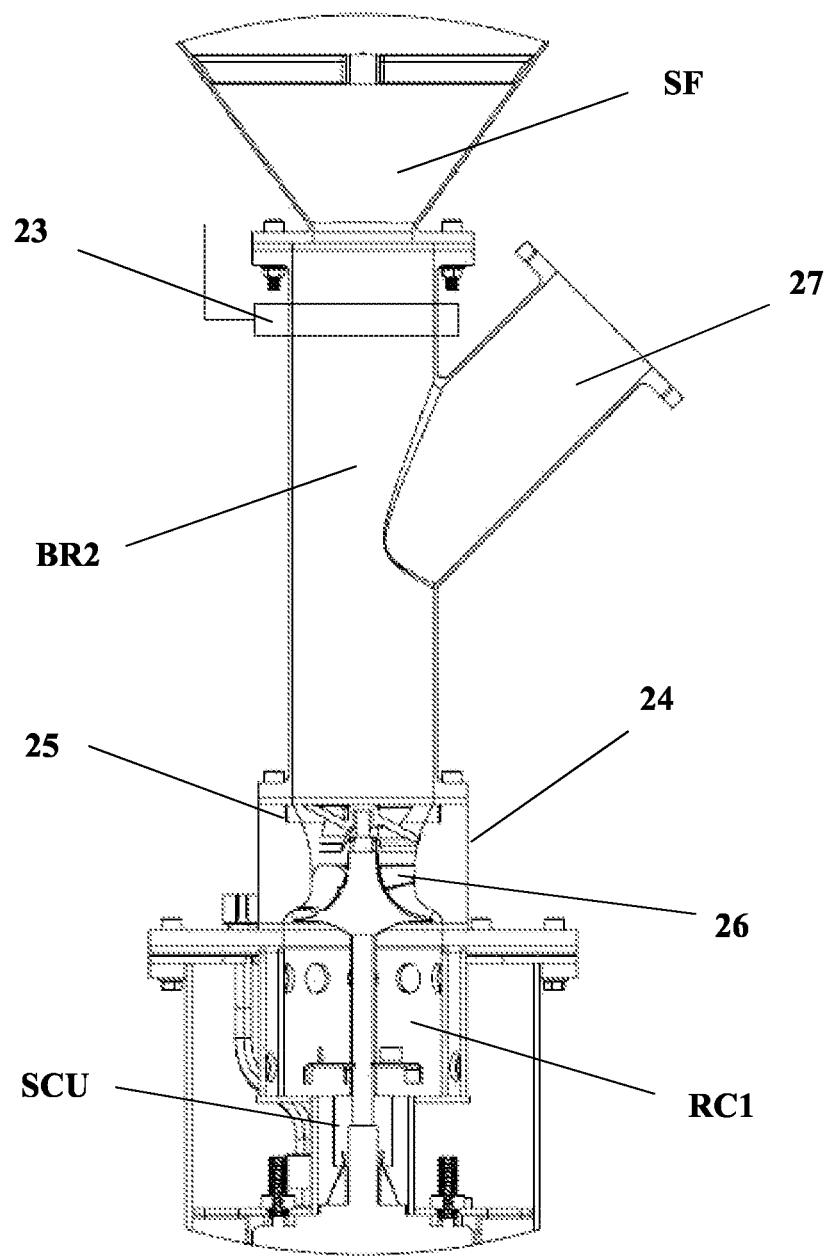
FIG. 24 shows an up-close view of the internal of the second embodiment of a dry substance funnel.
Figure 25:
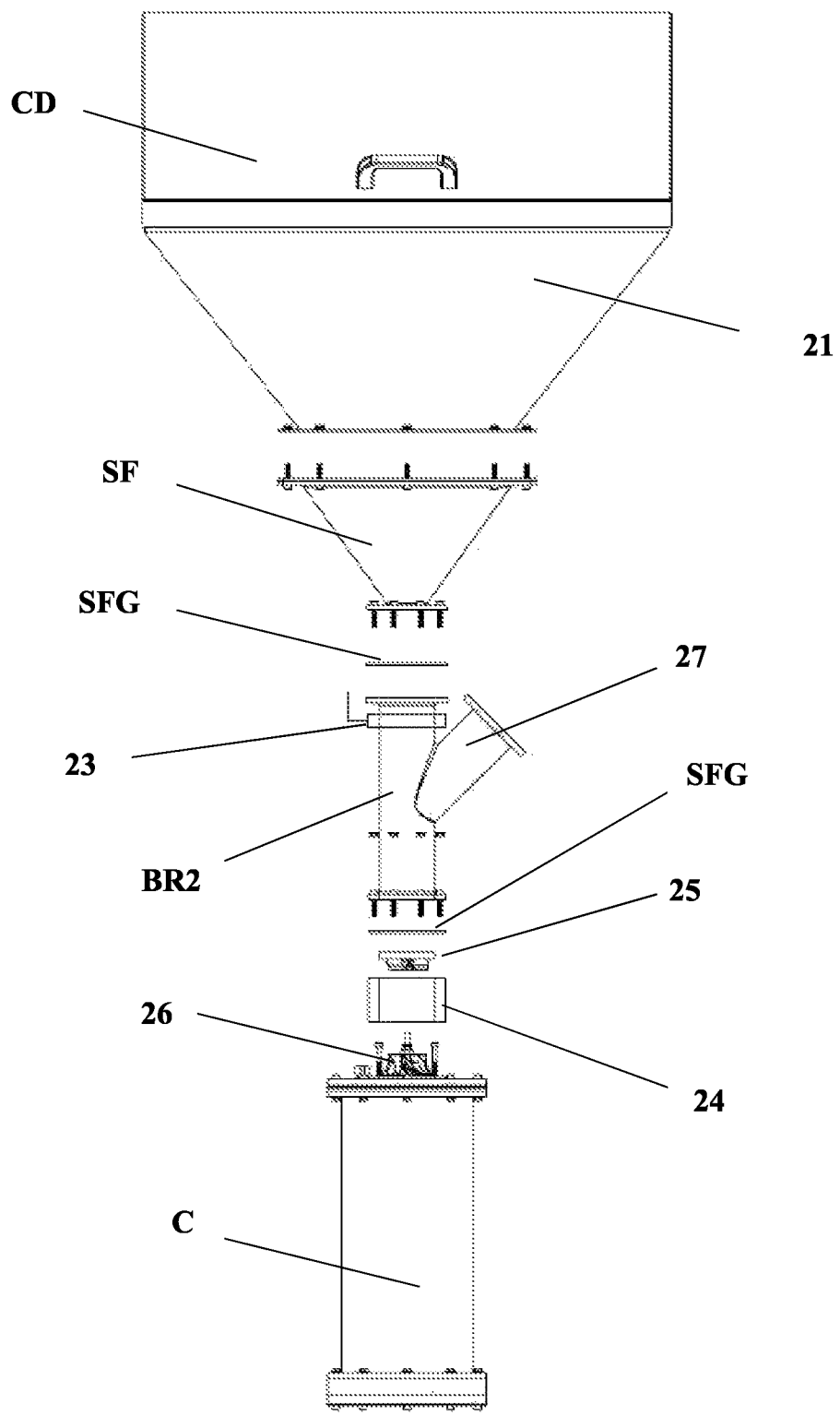
FIG. 25 shows an exploded view of the components of the second embodiment of the dry substance funnel attached to the liquid polymer or chemical activation system, in accordance with the principles of the present invention.

In the second embodiment, the narrow portion of the dry substance funnel SF is connected to the top end of a larger blending reactor BR2 via one or more bolts, screws or fasteners S, as shown in FIGS. 23-25. A gasket SFG may be incorporated between the dry substance funnel SF and top portion of the blending reactor BR2 for better connection between these two elements. In this embodiment, the blending reactor BR2 comprises a control valve 23 for controlling the amount of dry substances that enters the blending reactor BR2; and also comprises an inlet 27 for receiving liquid substances. The bottom end of the blending reactor BR2 is connected, via one or more bolts, screws or fasteners S, to a compartment 24 that includes a stator 25. The compartment 24, in turn, is connected to the top cover plate 4. The stator 25 comprises one or more jet impellers 26, which serve the purpose of pushing the substances from the blending reactor BR2 into the first retention cup RC1. A gasket SFG may be incorporated between the bottom portion of the blending reactor BR2 and the compartment 24 for better connection between these two elements. Once a dry substance is poured through the dry substance funnel SF, the substance is led to the blending reactor BR2 where it comes into contact with the liquid substance poured via the inlet 27. The substances are then vigorously mixed by the jet impellers 26 and are then pushed into the first retention cup RC1 to be mixed in accordance with the principles of the present invention, as already discussed herein.

It is important to note that in this second embodiment, the liquid polymer activation or chemical system 1 also comprises a longer a shaft extension SE2 that extends from the shaft coupling unit SCU all the way to the compartment 24 and is connected to the jet impellers 26. As such, the rotation of the shaft extension SE2 enables the rotation of the jet impellers 26.

Figure 26:
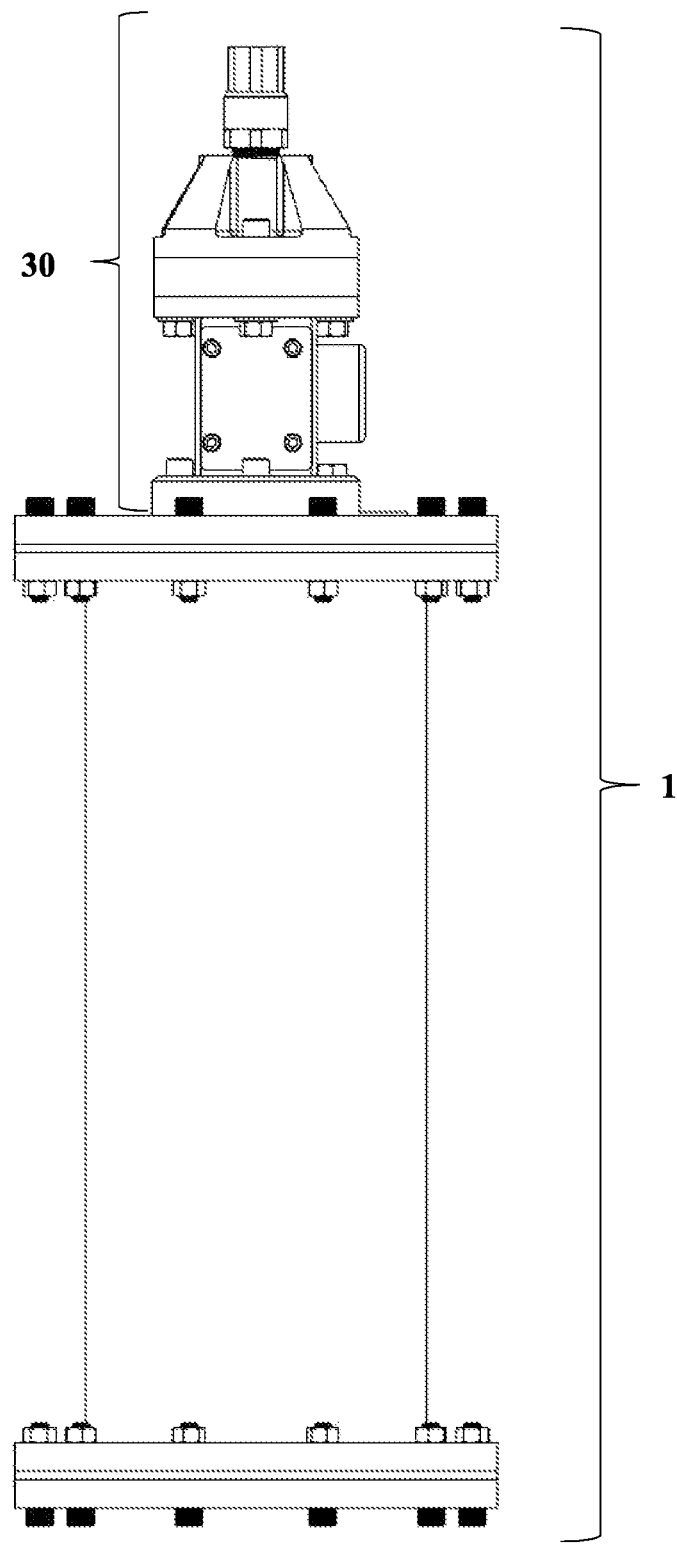
FIG. 26 shows a hybrid pump and blending reactor connected to a liquid polymer or chemical activation system, in accordance with the principles of the present invention.
Figure 27:
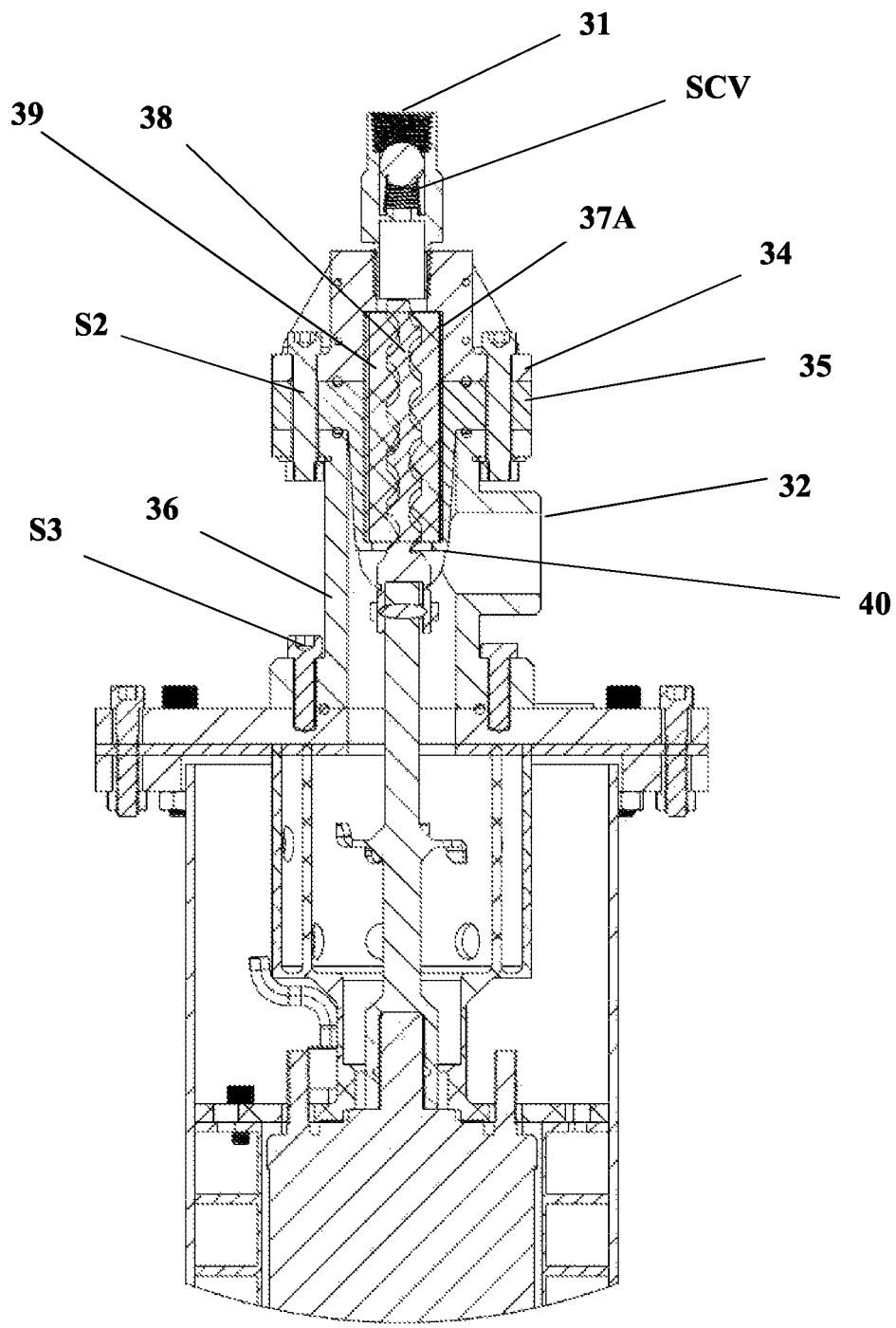
FIG. 27 shows a cutaway view of the hybrid pump and blending reactor, in accordance with the principles of the present invention.
Figure 28:
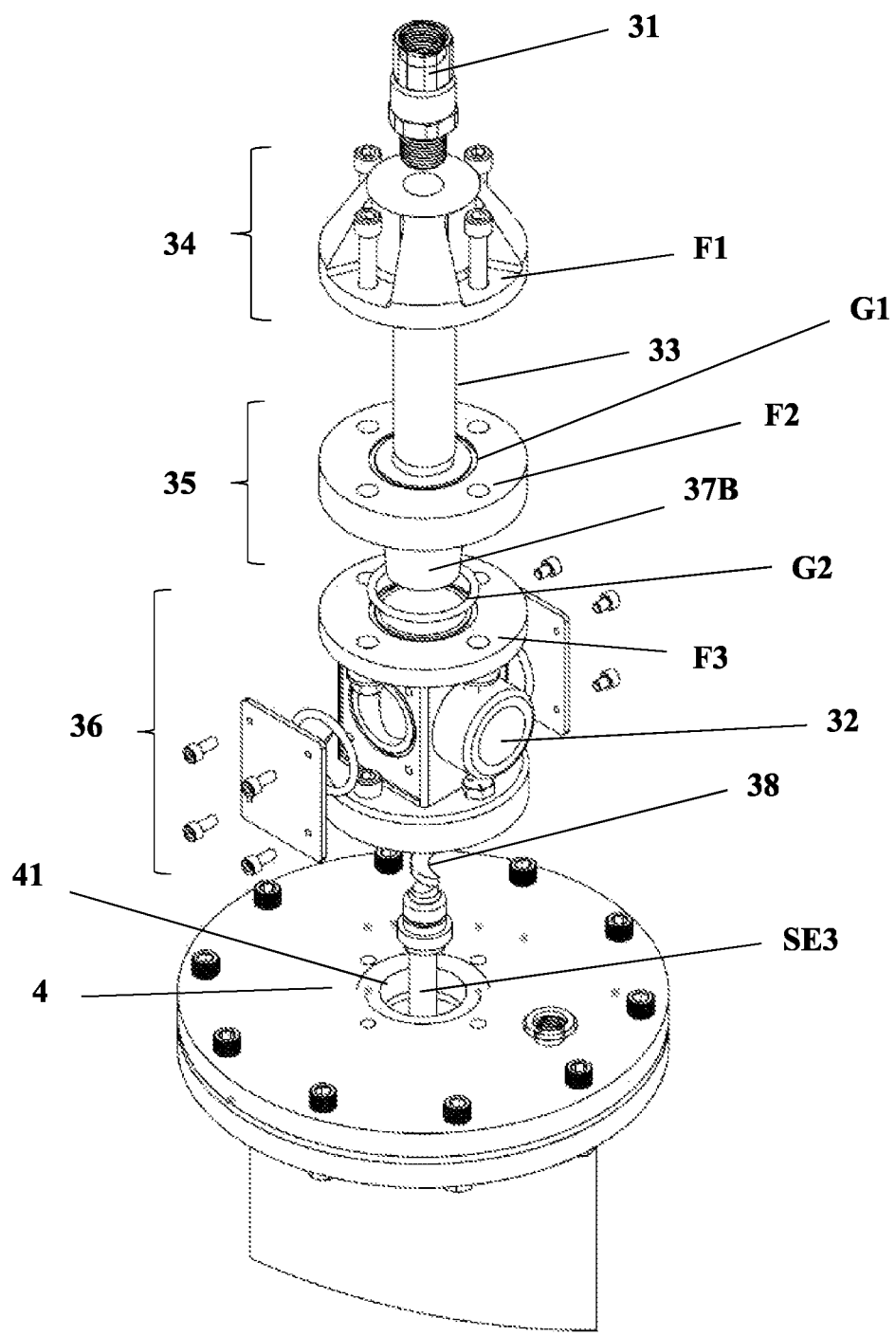
FIG. 28 shows an exploded view of the components of the hybrid pump and blending reactor, in accordance with the principles of the present invention.

FIGS. 26-30 show an alternate embodiment of the liquid polymer or chemical activation system 1 previously described in FIGS. 1-17. In this embodiment, in place of the blending reactor 10, the liquid polymer or chemical activation system 1 includes a hybrid pump and blending reactor 30 (the "HP blending reactor"), as shown on FIG. 27. The HP blending reactor 30 comprises at least two inlets 31, 32, a submersible progressive cavity pump 33, a progressive cavity pump supporting top 34 (the "PCP supporting top"), a progressive cavity pump supporting base 35 (the "PCP supporting base") and a connecting port 36, wherein the progressive cavity pump 33 comprises a rotor 38 and stator 39; and wherein the progressive cavity pump 33 is enclosed within the PCP supporting top 34 and PCP supporting base 35. Such enclosure is possible because both the PCP supporting top 34 and PCP supporting base 35 include an internal opening or chamber 37A, 37B, in which the openings 37A, 37B align with one another and are configured to support and/or hold the stator 39 component of the submersible progressive cavity pump 33 tightly in place, as shown in FIGS. 27-28. As such, the PCP supporting top 34 and PCP supporting base 35 work as a housing for the PCP cavity pump 33.

The PCP supporting top 34, the PCP support base 35 and the connecting port 36, all comprise flanges or lips F1, F2, F3, that align with one another and include one or more holes configured to receive one or more bolts S2. In this manner, the PCP supporting top 34, the PCP supporting base 35 and the connecting port 36, are tightly pressed against each other when secured via the one or more bolts, screws or fasteners S2. It should be noted that while one end (i.e., the top end) of the connecting port 36 is secured to the PCP supporting top 34 and PCP supporting base 35, the opposite end (i.e., the bottom end) of the connecting port 36 is secured, via one or more bolts S3, to the top cover plate 4. Furthermore, while one end (i.e., the bottom end) of the PCP supporting top 34 is secured to the PCP supporting base 35 and connecting port 36, the opposite end (i.e., the top end) is connected to the first inlet 31, as further discussed below. An O-ring seal G1, G2 may be included between the PCP supporting top 34 and PCP supporting base 35 and/or between the PCP supporting base 35 and connecting port 36, to prevent substance leakage in these areas.

As previously noted, the HP blending reactor 30 comprises a first inlet 31 and a second inlet 32. As shown in FIGS. 26-28, the first inlet 31 is connected or secured to a top end of the PCP supporting top 34, and its purpose is to facilitate the introduction of a first substance, preferably a polymer, into the HP blending reactor 30. The second inlet 32, on the other hand, is located on the connecting port 36 and its purpose is to facilitate the introduction of a second substance, preferably water, into the HP blending reactor 30. The first inlet 31, which may include a suction check valve SCV, leads the first substance into the progressive cavity pump 33, which, as previously noted, comprises a rotor 38 and a stator 39. The basic working principle of operation is a rotor (usually made of solid metal) shaped as a single helix rotating inside a stator (usually made of an elastomer) that has a double helix cavity. The rotation of the rotor 38 in the progressive cavity pump 33 creates a vacuum that pulls the first substance from the first inlet 31 towards the connecting port 36. As the first substance passes along the progressive cavity pump 33, the rotor 38 creates doses of the first substance before it (i.e., the first substance) reaches the connecting port 36. The connecting port 36 provides a second point of access to the HP blending reactor 30, via the second inlet 32, that is independent from the first inlet 31. In this manner, the second substance only comes into contact with the first substance once the desired doses of the first substance have been generated by the progressive cavity pump 33. Accordingly, it is only after the first substance (e.g., the polymer) reaches the connecting port 36, that the first substance comes into contact and mixes with the second substance (e.g., water). The first and second substances are then led into the first retaining cup RC1 for further mixing, in accordance with the principles of the present invention, as already discussed herein.

Figure 29:
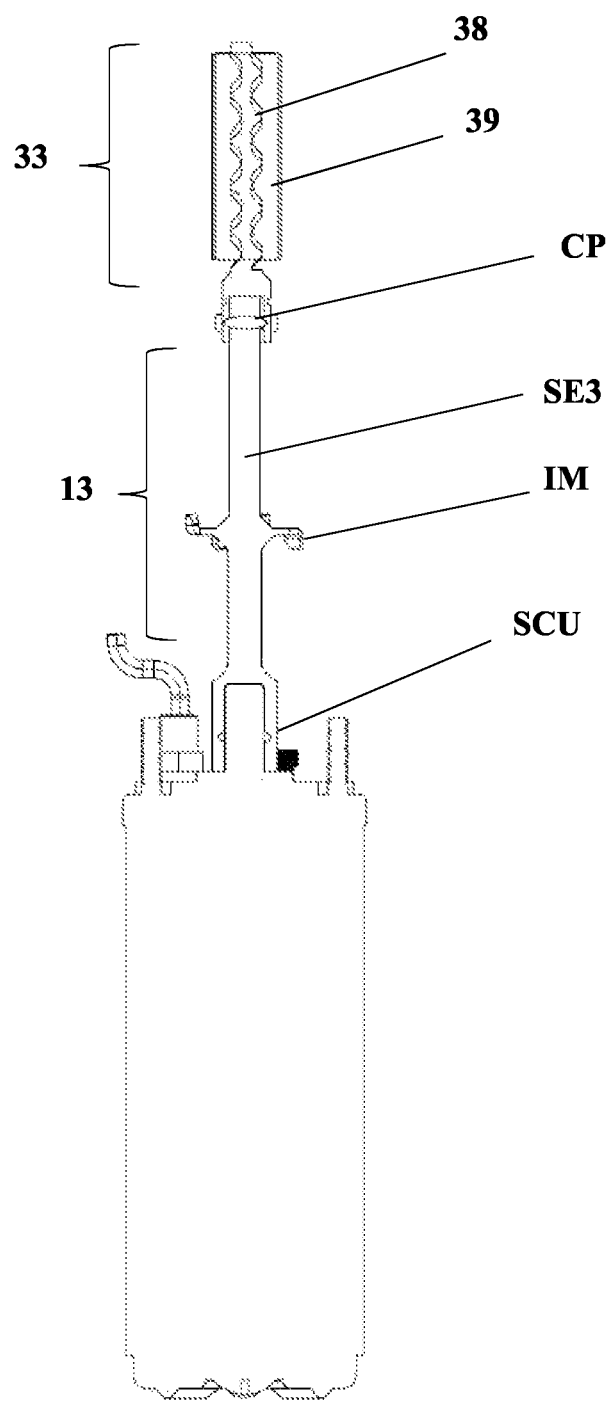
FIG. 29 shows a shaft extension and progressive cavity pump of the hybrid pump and blending reactor, in accordance with the principles of the present invention.
Figure 30:
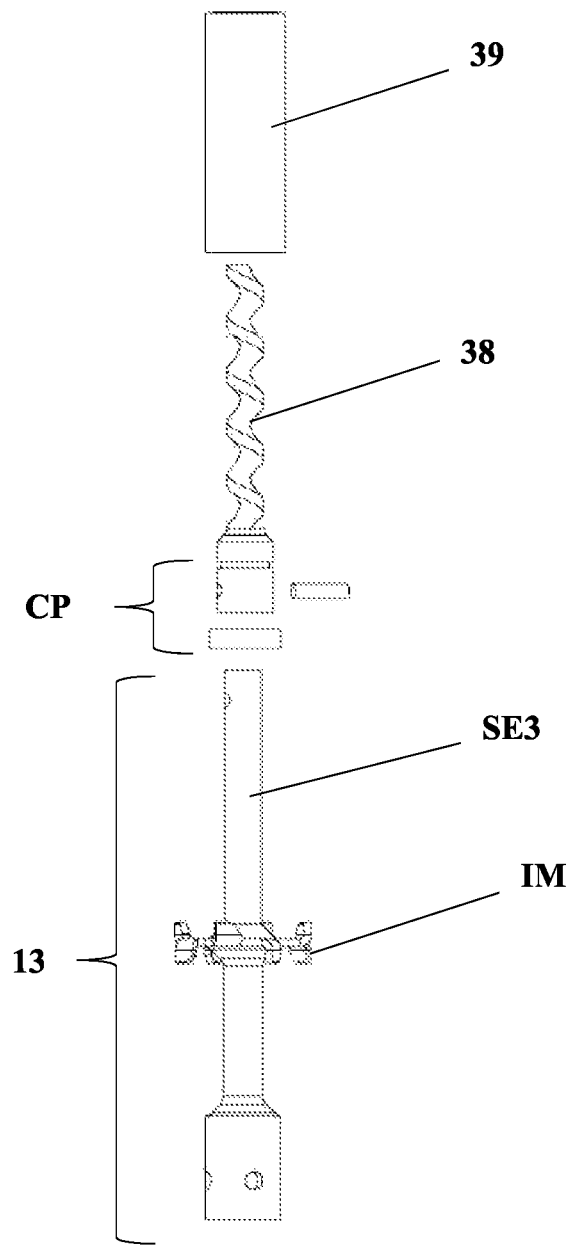
FIG. 30 shows an exploded view of the shaft extension and components of the progressive cavity pump of the hybrid pump and blending reactor, in accordance with the principles of the present invention.

Furthermore, this alternate embodiment of the liquid polymer or chemical activation system 1 also includes a shaft extension SE3 that extends from the shaft coupling unit SCU all the way to the progressive cavity pump 33 in the HP blending reactor 30. Particularly, one end of the shaft extension SE3 is connected to the shaft coupling unit SCU and the other end is connected to the rotor 38 in the progressive cavity pump 33, via a coupling pin CP mechanism, as shown in FIGS. 29-30. The portion of the shaft extension SE3 in the first retaining cup RC1 includes a high sheer mixer 13, which in turn comprises an impeller IM. The submersible actuator 15 actuates the rotation of the shaft extension SE3 and consequently the rotation of the high shear mixer 13, the impeller IM and the rotor 38. Lastly, it is important to note that the cover plate 4 and PCP supporting base 35 each have an opening 40, 41, in order to provide the shaft extension SE3 with access to the progressive cavity pump 33 from the shaft coupling unit SCU. These openings allow the shaft extension SE3 to engage with both the shaft coupling unit SCU on one end and the rotor 38 on the other end.

In summary of the previous sections, the disclosure presented here is structurally innovative, presents advantages not available at the moment with blending system, complies with all new patent application requirements and is hereby lawfully submitted to the patent bureau for review and the granting of the commensurate patent rights. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. A liquid polymer or chemical activation system, comprising:
  a chamber having a top chamber flange on a first distal end and a bottom chamber flange on a second distal end, wherein each distal end is opposite to each other;
  a top cover plate secured to the top chamber flange on the first distal end of the chamber via one or more bolts;
  a middle cover plate and a bottom cover plate secured to the bottom chamber flange on the second distal end of the chamber via one or more bolts, wherein the middle cover plate lies between the lower chamber flange and the bottom cover plate;
  wherein such configuration creates a hollow space inside the chamber that is flanked by the top cover plate and the bottom cover plate;
  a hybrid pump and blending reactor (HP blending reactor) that comprises a first inlet for receiving at least a first substance, a second inlet for receiving at least a second substance, a progressive cavity pump, a progressive cavity pump supporting top (PCP supporting top), a progressive cavity pump supporting base (PCP supporting base) and a connecting port;
  wherein the HP blending reactor is secured to the top cover plate;
  wherein the first inlet is secured to the PCP supporting top;
  wherein the second inlet is located on the connecting port;
  wherein the progressive cavity pump comprises a rotor and stator;
  wherein the progressive cavity pump is enclosed within a chamber in the PCP supporting top and PCP supporting base;
  wherein the rotor is configured to rotate and lead the first substance into the connecting port;
  wherein the connecting port is configured to receive the first substance from the progressive cavity pump and the second substance from the second inlet, thereby allowing the first and second substances to come into contact with each other;
  an upper multistage mixing cup configured to receive the first and second substances from the connecting port of the HP blending reactor;
  at least one high shear mixer for mixing the first and second substances;
  at least one submersible actuator for actuating the high shear mixer and rotor;
  wherein the high shear mixer is attached to a shaft extension which, in turn, has a first end that is coupled to the submersible actuator via a shaft coupling unit;
  wherein the rotor is attached to a second end of the shaft extension via a coupling pin;
  an intermediate blending section configured to receive the first and second substances from the upper multistage mixing cup;
  a cup base flange having a support platform for supporting one end of the upper multistage mixing cup;
  a lower multistage aging cup for further mixing of the first and second substances;
  wherein the upper multistage mixing cup comprises at least a first retention cup and a second retention cup, and wherein the second retention cup encircles the first retention cup;
  wherein the first and second substances are mixed by the high shear mixer in the first retention cup;
  wherein the second retention cup is configured to receive the first and second substances flowing from the first retention cup for further mixing;
  wherein the first and second substances are forwarded from the second retention cup into the intermediate blending section, where the first and second substances come into contact with the cup base flange;
  wherein the cup base flange is secured to the submersible actuator and comprises one or more holes configured to lead the first and second substances into the lower multistage aging cup;

wherein a first end of the at least one submersible actuator is connected to the cup base flange and a second end of the submersible actuator is fixed to the middle cover plate, which serves a support base for the submersible actuator;

wherein the lower multistage aging cup comprises a plurality of rings surrounding the submersible actuator, each ring having one or more holes configured to allow the first and second substances to flow into each subsequent ring until reaching the middle cover plate; and wherein the first and second substances are directed from the middle cover plate, via one or more holes on the middle cover plate, to the bottom cover plate which, in turn, has at least one outlet for releasing the mixed first and second substances.

2. The liquid polymer or chemical activation system of claim 1, wherein the chamber, the top cover plate, the middle cover plate and the bottom cover plate have a circular shape.

3. The liquid polymer or chemical activation system of claim 2, wherein the plurality of rings surrounding the submersible actuator have a circular shape.

4. The liquid polymer or chemical activation system of claim 1, wherein the chamber, the top cover plate, the middle cover plate and the bottom cover plate have a squared shape.

5. The liquid polymer or chemical activation system of claim 4, wherein the plurality of rings surrounding the submersible actuator have a squared shape.

6. The liquid polymer or chemical activation system of claim 1, further comprising a first top gasket, a cup flange and a second top gasket secured to the top chamber flange on the first distal end of the chamber via one or more bolts, wherein the first top gasket, the cup flange, and the second top gasket lie between the top cover plate and the top chamber flange.

7. The liquid polymer or chemical activation system of claim 6, wherein the cup flange forms a celling to the intermediate blending section.

8. The liquid polymer or chemical activation system of claim 1, wherein the high shear mixer comprises at least one impeller to assist in mixing the one or more substances before reaching the second retention cup.

9. The liquid polymer or chemical activation system of claim 1, wherein the support platform has at least one opening that provides the shaft coupling unit with access to the submersible actuator.

10. The liquid polymer or chemical activation system of claim 1, wherein the first retention cup and the second retention cup include one or more openings for facilitating the flow of the first and second substances.

11. The liquid polymer or chemical activation system of claim 1, wherein the second retention cup includes one or more openings for facilitating the flow of the first and second substances into the intermediate blending section.

12. The liquid polymer or chemical activation system of claim 1, wherein the submersible actuator is an electric motor.

13. The liquid polymer or chemical activation system of claim 1, wherein the submersible actuator is a hydraulic motor or a pneumatic motor.

14. The liquid polymer or chemical activation system of claim 13, further comprising a pneumatic or hydraulic power source that provides power to the pneumatic or hydraulic motor via inputs on the bottom cover plate.

15. The liquid polymer or chemical activation system of claim 1, wherein the plurality of rings surrounding the submersible actuator are linear in relation to the submersible actuator.

16. The liquid polymer or chemical activation system of claim 1, wherein the plurality of rings surrounding the submersible actuator are concave in relation to the submersible actuator.

17. The liquid polymer or chemical activation system of claim 1, wherein the plurality of rings surrounding the submersible actuator are convex in relation to the submersible actuator.

18. The liquid polymer or chemical activation system of claim 1, wherein the one or more holes in each ring of the plurality of rings surrounding the submersible actuator do not align with each other.

19. The liquid polymer or chemical activation system of claim 1, wherein the upper multistage mixing cup comprises three or more retention cups.

* * * * *